(12) United States Patent
Sugaya

(10) Patent No.: US 9,057,911 B2
(45) Date of Patent: Jun. 16, 2015

(54) DIRECT TYPE BACKLIGHT DEVICE AND LIQUID CRYSTAL DISPLAY USING THE SAME

(71) Applicant: NLT Technologies, Ltd., Kanagawa (JP)

(72) Inventor: Hiroki Sugaya, Kanagawa (JP)

(73) Assignee: NLT TECHNOLOGIES, LTD., Kanagawa (JP)

( * ) Notice: Subject to any disclaimer, the term of this patent is extended or adjusted under 35 U.S.C. 154(b) by 102 days.

(21) Appl. No.: 13/680,657

(22) Filed: Nov. 19, 2012

(65) Prior Publication Data

US 2013/0188114 A1 Jul. 25, 2013

(30) Foreign Application Priority Data

Nov. 28, 2011 (JP) ................. 2011-259659

(51) Int. Cl.
 *G02F 1/1335* (2006.01)
 *G09F 13/04* (2006.01)

(52) U.S. Cl.
 CPC .......... *G02F 1/133603* (2013.01); *G09F 13/04* (2013.01)

(58) Field of Classification Search
 CPC .............. G02F 1/133602; G02F 1/133606
 USPC ................................. 349/62
 See application file for complete search history.

(56) References Cited

U.S. PATENT DOCUMENTS

| | | | |
|---|---|---|---|
| 7,320,531 B2 | 1/2008 | West et al. | |
| 2004/0174706 A1* | 9/2004 | Kan | 362/241 |
| 2005/0001537 A1* | 1/2005 | West et al. | 313/500 |
| 2007/0146573 A1* | 6/2007 | Yang et al. | 349/69 |
| 2008/0030991 A1* | 2/2008 | Yeh | 362/249 |
| 2009/0284969 A1* | 11/2009 | Chang | 362/241 |
| 2009/0323334 A1* | 12/2009 | Roberts et al. | 362/247 |
| 2010/0141865 A1* | 6/2010 | Jung | 349/61 |
| 2010/0165246 A1* | 7/2010 | Sekiguchi et al. | 349/62 |
| 2011/0176304 A1* | 7/2011 | Kim et al. | 362/235 |
| 2011/0304796 A1* | 12/2011 | Lee et al. | 349/62 |
| 2012/0092585 A1* | 4/2012 | Byeon et al. | 349/58 |
| 2012/0105763 A1* | 5/2012 | Takeuchi et al. | 349/61 |
| 2012/0300456 A1* | 11/2012 | Phillips et al. | 362/245 |

FOREIGN PATENT DOCUMENTS

JP 2005-332828 12/2005

* cited by examiner

*Primary Examiner* — Ed Glick
*Assistant Examiner* — Sang V Nguyen
(74) *Attorney, Agent, or Firm* — Young & Thompson

(57) ABSTRACT

A direct type LED backlight device improves color unevenness on the periphery of the display region without increase of the driver and its control circuit and contour change of a liquid crystal panel. This device includes a bottom wall, a set of optical members arranged opposite to an inner surface of the bottom wall, a side wall maintaining the bottom wall and the set of optical members at a predetermined distance, and LEDs fixed to the inner surface of the bottom wall. The side wall has a protrusion protruding toward a central portion of a space formed by the bottom wall, the side wall, and the set of optical members. At least part of emission surfaces of the LEDs arranged at outermost positions are overlapped with the protrusion and located at such positions as to be invisible when seen along a direction perpendicular to the set of optical members.

15 Claims, 17 Drawing Sheets

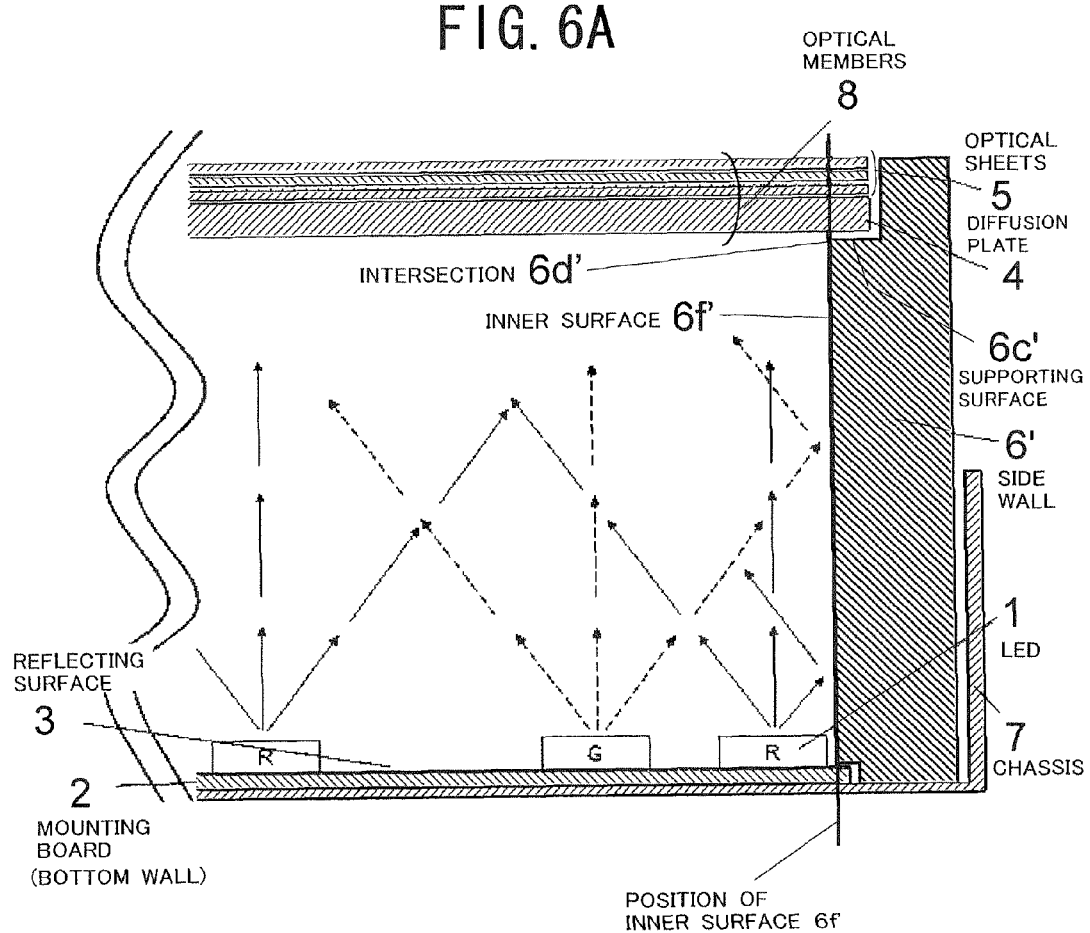

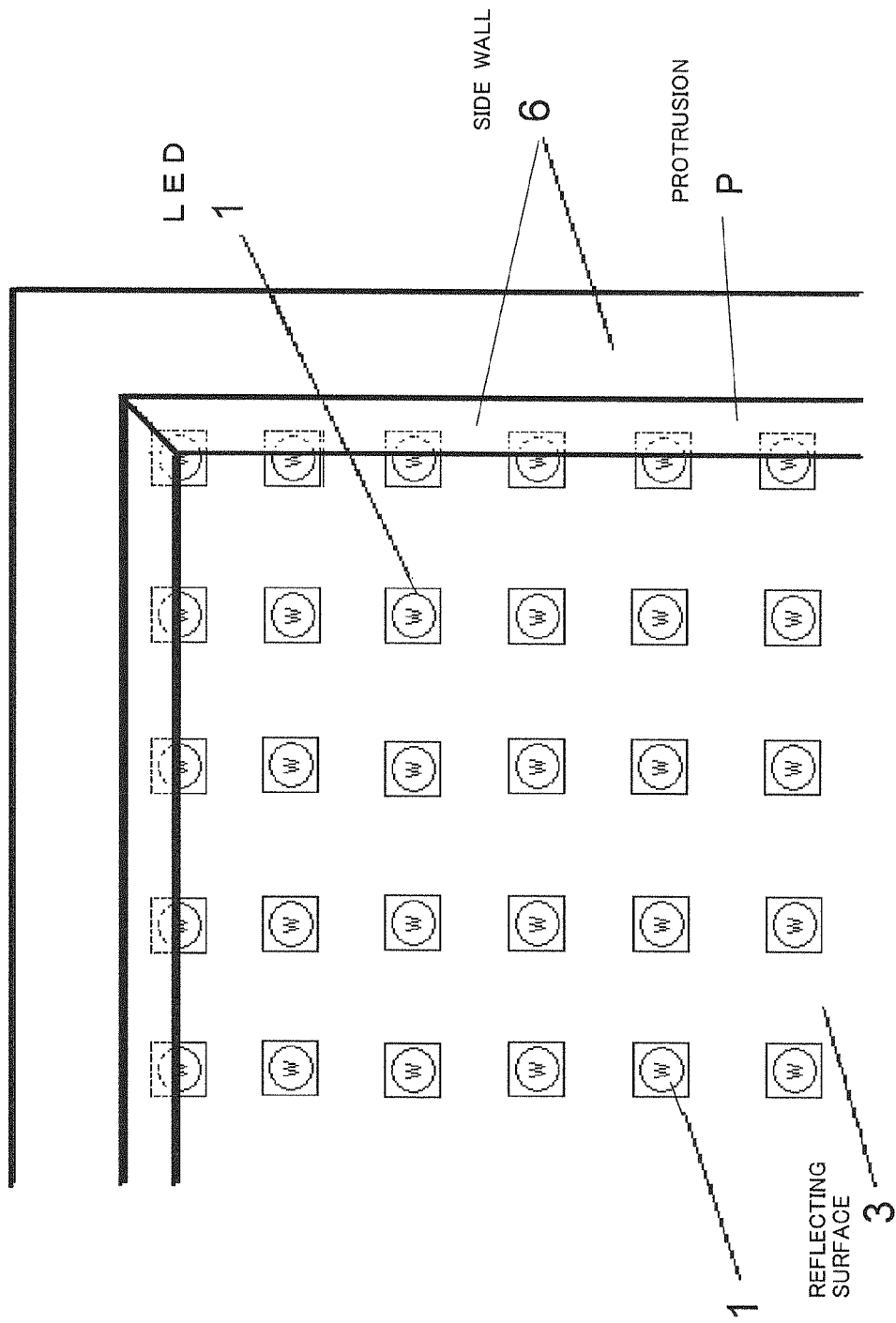

DIRECT TYPE BACKLIGHT DEVICE AND LIQUID CRYSTAL DISPLAY USING THE SAME

BACKGROUND OF THE INVENTION

1. Field of the Invention

The present invention relates to a backlight device and more particularly, to a direct type backlight device using Light-Emitting Diodes (LEDs) as its light source, and a Liquid Crystal Display (LCD) using the backlight device.

2. Description of the Related Art

As one use of LEDs, a white LED light source that emits white light is known, which is formed by combining a white (W) LED with three color LEDs of red (R), green (G) and blue (B) colors, or combining a white LED with some color LEDs other than red, green and blue LEDs. In recent years, the output power of LEDs has been increased at a high pace and thus, the applications of white LED light sources of this type have been becoming broader.

In particular, applications for illumination devices necessitating high brightness, light sources for projectors, and backlight devices for large-sized LCDs have been discussed. Since LEDs have the features that environmental load is small due to their mercury free property, color reproductivity is good, responsiveness is good, brightness is changeable, and lifetime is long, white LED light sources are expected as an alternative white light source to the conventional fluorescent lamps (i.e., hot cathode fluorescent lamps and cold cathode fluorescent lamps).

When white LED light sources are used for the aforementioned applications, i.e., illumination, light sources for projectors, and backlight devices for large-sized LCDs, a lot of LEDs each serving as a point light source is necessarily used in order to achieve required brightness to constitute an area light source in the present circumstances. Furthermore, brightness unevenness and chromaticity unevenness in the overall area light source need to be suppressed within predetermined ranges.

Here, when backlight devices using LEDs (i.e., LED backlight devices) are divided according to their structure, they may be classified into the edge light type and the direct type. These two types are typical.

With the edge light type, a light guide plate is disposed adjacent to a set of optical sheets including a diffusion sheet and a prism sheet, and illumination light emitted from aligned LEDs is inputted into one end face of the light guide plate. In this way, the illumination light from the LEDs is made perpendicular to the direction along which the illumination light is to be irradiated from the backlight device, thereby generating an area light source.

With the direct type, a diffusion plate is disposed adjacent to the lower surface of a set of optical sheets including a diffusion sheet and a prism sheet, and LEDs are arranged to have a predetermined pattern (which forms an LED array) directly below the diffusion plate. Illumination light emitted from the LEDs is inputted into one main surface of the diffusion plate. In this way, the illumination light from the LEDs is made parallel to the direction along which the illumination light is to be irradiated from the backlight device, thereby generating an area light source. It is said that the direct type is suitable for comparative large-sized backlight devices because this type has an advantage that brightness can be raised easily.

However, when the thickness of the direct type backlight device is limited, in other words, when the direct type backlight device has a thin profile, the optical path length from the LEDs to the diffusion plate is short and therefore, it is comparatively difficult to disperse uniformly the light from the respective color LEDs within the surface. As a result, there arises a difficulty that brightness unevenness and chromaticity unevenness are likely to occur. In particular, in the case of a white LED light source using three-color LEDs of red, green and blue colors, the arrangement positions of the LEDs are shifted from desired ones due to the contour size difference among the LEDs and at the same time, the emission peak of each color light is shifted from desired ones due to the arrangement position shifts of the LEDs. Accordingly, in-plane color unevenness is likely to occur.

The aforementioned color unevenness caused by the aforementioned arrangement position shifts of the three-color LEDs of red, green, and blue colors in the direct type backlight device with a thin profile does not occur in the central part (i.e., the part other than the peripheral part) of the same backlight device. This is because at any position in the central part, the light emitted from the LEDs is well mixed with the light from the surrounding LEDs to result in white light. The reason why color unevenness occurs in the peripheral part (i.e., in the neighborhood of the side wall) of the backlight device of this type is that the total amount of the light from the LEDs arranged along the side wall of the backlight device within the LED array (in other words, the LEDs arranged in the neighborhood of the side wall) is less than the total amount of the light from the LEDs arranged in the remaining part and thus, the light are not mixed to white light, resulting in a biased color of light which corresponds to the emission color of the LEDs arranged in the neighborhood of the same side wall.

As a method of improving the aforementioned color unevenness, Patent Literature 1 discloses a technique for enhancing color uniformity. In this technique, LEDs arranged in the neighborhood of a side wall are applied with a driving current different from that for LEDs arranged in the remaining positions. Thus, brightness of the LEDs in the neighborhood of the side wall is made lower than that of the LEDs in the remaining positions, thereby enhancing color uniformity.

The aforementioned technique disclosed in Patent Literature 1 is explained below with reference to FIGS. 1 and 2. FIG. 1 is a cross-sectional view of the LCD device disclosed in Patent Literature 1 along a plane cutting the set of the LEDs. FIG. 2 is a drawing showing the technique that attenuates the brightness of the LEDs located at the ends of each strip in order to enhance color uniformity.

As shown in FIG. 1, this conventional LCD comprises a LCD layer 130 and a backlight device 132. The backlight device 132 comprises a lower mixing chamber 135, a diffusion film 101 as a first diffuser 176, an upper mixing chamber 175, a diffusion film 102 as a second diffuser 180, and a brightness enhancing film 182. The brightness enhancing film 182 is attached to the upper surface of an acrylic plate that constitutes the upper wall of the upper mixing chamber 175. The diffusion film 102 is attached to the lower surface of the same acrylic plate.

A predetermined number of three-color LEDs 134 of red, green, and blue colors are mounted on a circuit board 140 to have a predetermined layout in the lower mixing chamber 135. Each of the LEDs 134 comprises a side emission lens 142 and a spot reflector 166. The light emitted from the respective LEDs 134 is mixed in the lower mixing chamber 135 and diffused in the diffusion film 101 as the first diffuser 176, and thereafter, enters the upper mixing chamber 175 and mixed furthermore. Moreover, this light is diffused in the diffusion film 102 as the second diffuser 180 again, and propagates through the brightness enhancing film 182 placed on the upper surface of the backlight device 132 (the upper mixing chamber 175) to be irradiated to the LCD layer 130.

With the structure of FIG. 1, the color uniformity at the neighborhood (in the peripheral part) of the side wall 138 of the lower mixing chamber 135 of the backlight device 132 is enhanced by attenuating the optical outputs of some of the LEDs 134 that are located at the ends of the respective LED strips. The brightness of one to five LEDs 134 located at the ends of each LED strip can be attenuated according to the specific pattern or shape (e.g., the pitch and sequence of the LEDs 134) of the backlight device 132.

One of the various methods of attenuating the brightness of the LEDs 134 located at the ends of each LED strip is shown in FIG. 2. For simplification of explanation, a driver 1, a driver 2, and a driver 3 are illustrated to drive different groups of the LEDs 134 arranged along the LED strip in FIG. 2, respectively. For example, the driver 1 and 3 supply different electric currents from that supplied by the driver 2 to the corresponding red, green and blue LEDs 134 arranged along the LED strip in order to achieve desired color balance of red, green and blue colors with respect to the designated white point.

In FIG. 2, the last three LEDs 134 arranged at each end part of the LED strip are respectively driven by lower driving currents than that for the color LEDs 134 arranged at the remaining positions in the same LED strip. For example, the brightness of the green LEDs 134 located at the left and right end positions of the LED strip is set to be approximately half of the brightness of the green LEDs 134 located in the middle part of the LED strip. The brightness of the LEDs 134 located inwardly next to the left and right end positions of the LED strip is set to be approximately 50% to 75% of the brightness of the same color LEDs 134 located in the middle part of the LED strip. The brightness of the LEDs 134 located inwardly next but one to the left and right end positions of the LED strip is set to be approximately 60% to 90% of the brightness of the same color LEDs 134 located in the middle part of the LED strip. In this way, the brightness of the LEDs 134 arranged at the left and right end positions of the LED strip is reduced compared with the brightness of the same color LEDs 134 arranged at the middle part of the LED strip. In addition, the specific attenuation quantity of the brightness level is based on human perception for color uniformity, and the optimum attenuation quantity can be judged experimentally.

However, driving the LEDs 134 located in the end parts of the LED strip and the LEDs 134 located in the middle part thereof by different drivers similar to the aforementioned conventional backlight device 132 will induce problems, such as increase in costs due to increase of the drivers and their control circuits, and occupation space increase (this leads to contour change of the LCD).

SUMMARY OF THE INVENTION

The present invention was created while taking the above-described problems of the conventional backlight device 132 shown in FIGS. 1 and 2 into consideration.

An object of the present invention is to provide a direct type LED backlight device that improves color unevenness on the periphery of the display region without increase of the driver and its control circuit and change of the contour (e.g., the width of the picture frame) of a liquid crystal panel, and a LCD using the backlight device.

Another object of the present invention is to provide a direct type LED backlight device that improves brightness unevenness on the periphery of the display region without increase of the driver and its control circuit and change of the contour (e.g., the width of the picture frame) of a liquid crystal panel, and a LCD using the backlight device.

The above objects together with others not specifically mentioned will become clear to those skilled in the art from the following description.

According to the first aspect of the present invention, a direct type LED backlight device is provided, which comprises:
 a bottom wall;
 a set of optical members arranged opposite to an inner surface of the bottom wall at a predetermined distance;
 a side wall holding the bottom wall and the set of optical members at the predetermined distance; and
 LEDs as a light source, fixed to the inner surface of the bottom wall;
 wherein the side wall comprises a protrusion protruding toward a central portion of a space formed by the bottom wall, the side wall, and the set of optical members; and
 at least part of emission surfaces of the LEDs arranged at outermost positions are overlapped with the protrusion and located at such positions as to be invisible when seen along a direction perpendicular to the set of optical members.

With the direct type LED backlight device according to the first aspect of the present invention, the side wall comprises the protrusion protruding toward the central portion of the space which is formed by the bottom wall, the side wall, and the set of optical members. Moreover, the at least part of the emission surfaces of the LEDs arranged at the outermost positions are overlapped with the protrusion and located at such the positions as to be invisible when seen along the direction perpendicular to the set of optical members. Therefore, part of light emitted from the LEDs, the at least part of the emission surfaces of which are overlapped with the protrusion, can be made not to reach the set of optical members.

For this reason, color unevenness occurring on the periphery of the display region of the liquid crystal panel can be improved only by setting appropriately the protruding condition of the protrusion and an optical characteristic or characteristics (e.g., diffuse reflection, specular reflection, absorption and so on) of an irradiation surface of the protrusion to which the light from the LEDs are to be irradiated.

Furthermore, the driver and its control circuit are not increased and the contour of a LCD such as the width of the picture frame is not changed for the aforementioned color unevenness improvement.

In this way, with the direct type LED backlight device according to the first aspect of the present invention, color unevenness on the periphery of the display region can be improved without increase of the driver and its control circuit and change of the contour (e.g., the width of the picture frame) of a LCD device.

In a case where the light source is formed by the white LEDs emitting white light only, brightness unevenness on the periphery of the display region can be improved without increase of the driver and its control circuit and change of the contour (e.g., the width of the picture frame) of a LCD device.

In addition, the aforementioned "protrusion" includes at least a part that protrudes from an inside of the side wall toward the central portion of the space formed by the bottom wall, the side wall, and the set of optical members and that overlaps with the at least part of the emission surfaces of the LEDs arranged at the outermost positions. The "protrusion" may include a neighboring region or part of this protruding part.

In a preferred embodiment of the direct type LED backlight device according to the first aspect of the present invention, a top end of the protrusion is located at a position shifted outward along the bottom wall with respect to centers of the emission surfaces of the LEDs arranged at the outermost positions.

In another preferred embodiment of the direct type LED backlight device according to the first aspect of the present invention, the side wall comprises a supporting surface for supporting the set of optical members, and an intersection formed by intersecting the supporting surface with an inner surface of the side wall is located at a position shifted outward along the bottom wall with respect to the top end of the protrusion.

In still another preferred embodiment of the direct type LED backlight device according to the first aspect of the present invention, positions of the top end of the protrusion and the intersection are determined in such a way that an outermost end of a display region of a liquid crystal panel to be combined with the backlight device is located between the top end of the protrusion and the intersection.

In a further preferred embodiment of the direct type LED backlight device according to the first aspect of the present invention, the light source has a cluster structure formed by combination of the LEDs emitting different color light.

In a further preferred embodiment of the direct type LED backlight device according to the first aspect of the present invention, the light source is formed by the LEDs emitting white light only.

In a further preferred embodiment of the direct type LED backlight device according to the first aspect of the present invention, the LEDs are arranged on the inner surface of the bottom wall at constant pitches to form a square arrangement or a staggered arrangement.

In a further preferred embodiment of the direct type LED backlight device according to the first aspect of the present invention, a region of the side wall that is closer to the bottom wall than the protrusion has an optically absorbing surface.

In a further preferred embodiment of the direct type LED backlight device according to the first aspect of the present invention, a region of the side wall that is closer to the bottom wall than the protrusion has a diffuse reflection surface or a specular reflection surface.

In a further preferred embodiment of the direct type LED backlight device according to the first aspect of the present invention, a region of the side wall that is closer to the bottom wall than the protrusion has an optically absorbing surface and one of a diffuse reflection surface and a specular reflection surface.

In a further preferred embodiment of the direct type LED backlight device according to the first aspect of the present invention, a cross section of the protrusion is approximately triangular or rectangular, and the inner surface of the side wall is a flat surface.

In a further preferred embodiment of the direct type LED backlight device according to the first aspect of the present invention, a cross section of the protrusion is approximately triangular or rectangular, and the inner surface of the side wall is a depressed curved surface.

In a further preferred embodiment of the direct type LED backlight device according to the first aspect of the present invention, the protrusion is selectively formed on only locations overlapped with the LEDs arranged at the outermost positions, and the protrusion does not exist between the LEDs.

In a further preferred embodiment of the direct type LED backlight device according to the first aspect of the present invention, the light source comprises bar-shaped LED sets each of which is formed by aligning the LEDs emitting different color light along a first direction, and the bar-shaped LED sets are arranged at constant pitches along a second direction perpendicular to the first direction; wherein the protrusion is provided only at two opposite portions of the side wall, the two opposite portions being adjacent to each end of the bar-shaped LED sets and extending along the second direction.

According to the second aspect of the present invention, a LCD is provided, which comprises:
a liquid crystal panel; and
the direct type LED backlight device according to the first aspect of the present invention.

With the LCD according to the second aspect of the present invention, the direct type LED backlight device according to the first aspect of the present invention is included, the same advantages as those of the direct type LED backlight device according to the first aspect of the present invention are obtained.

BRIEF DESCRIPTION OF THE DRAWINGS

In order that the present invention may be readily carried into effect, it will now be described with reference to the accompanying drawings.

FIG. 6A is a cross-sectional view showing the structure of the main part of a direct type LED backlight device whose side wall comprises no protrusion, which corresponds to the structure obtained by deleting the protrusion P of the side wall 6 in the direct type LED backlight device according to the first embodiment of the present invention.

FIG. 15 is a partial plan view of the LED array used in a direct type LED backlight device according to an eleventh embodiment of the present invention, where the LED array is seen from the display surface side (optical sheet side).

DETAILED DESCRIPTION OF THE PREFERRED EMBODIMENTS

Figure 1:
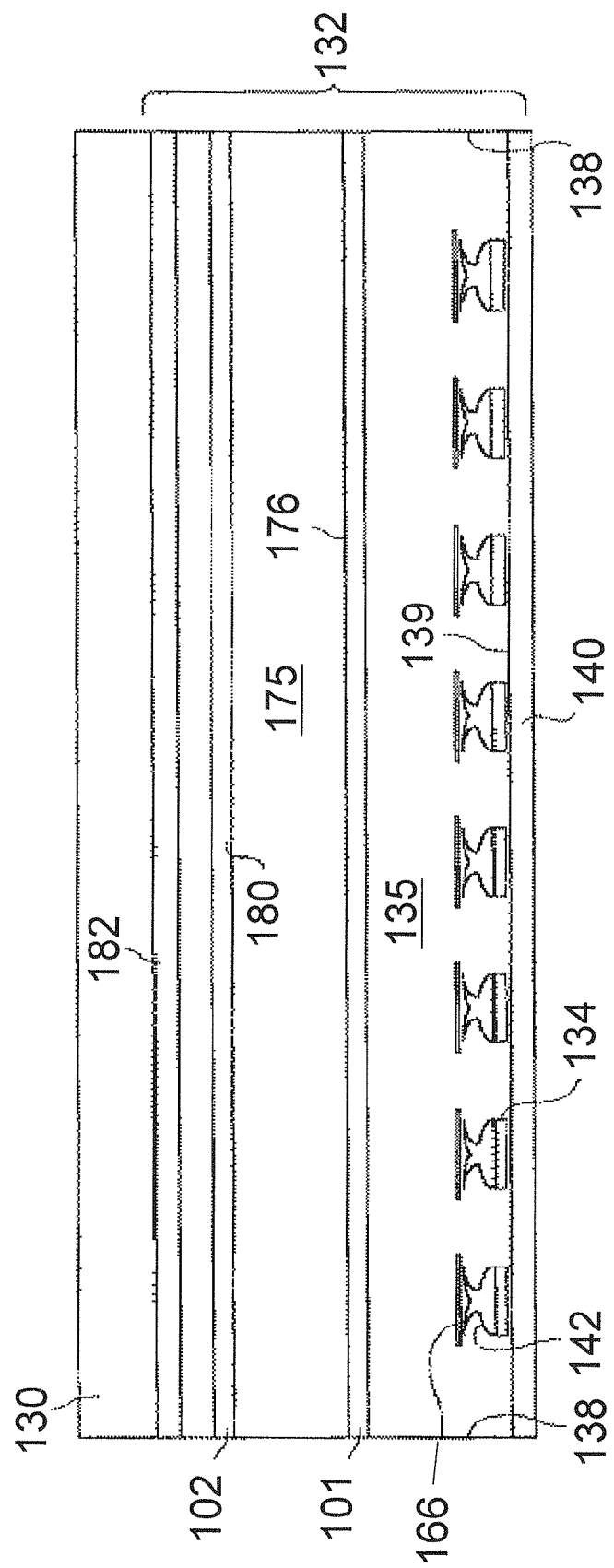
FIG. 1 is a cross-sectional explanatory view of a LCD device using a conventional direct type LED backlight device.

Preferred embodiments of the present invention will be described in detail below while referring to the drawings attached.

First Embodiment

Figure 3:
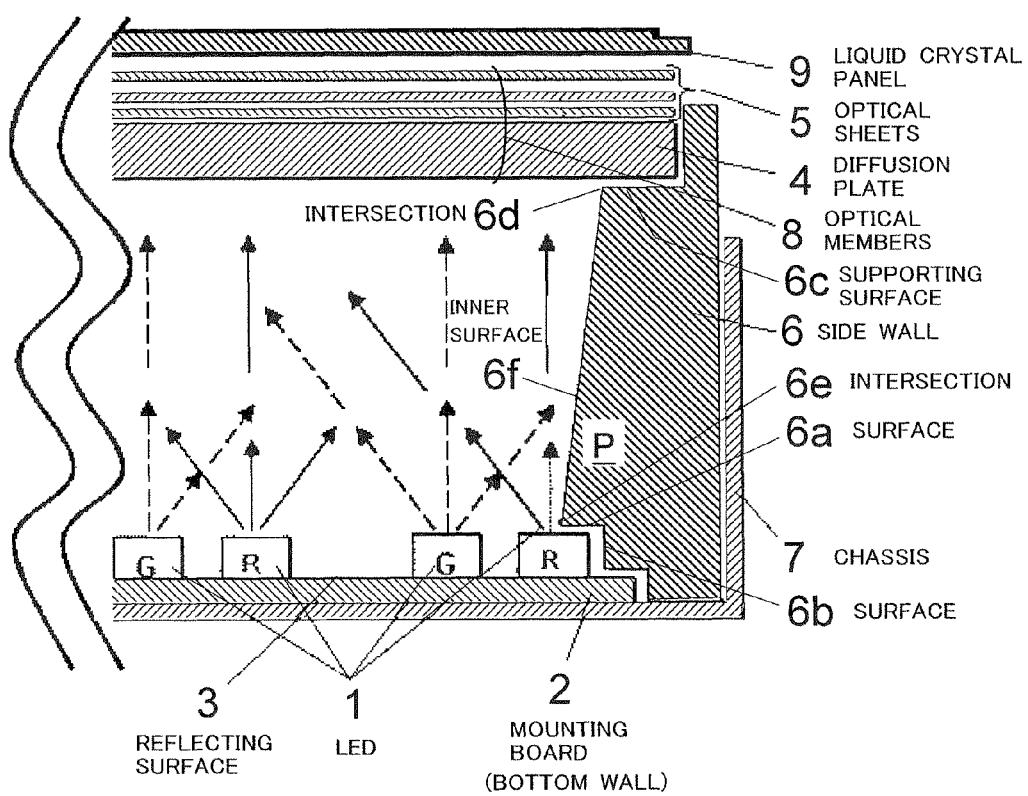
FIG. 3 is a cross-sectional view showing the structure of the main part of a direct type LED backlight device according to a first embodiment of the present invention.
Figure 4:
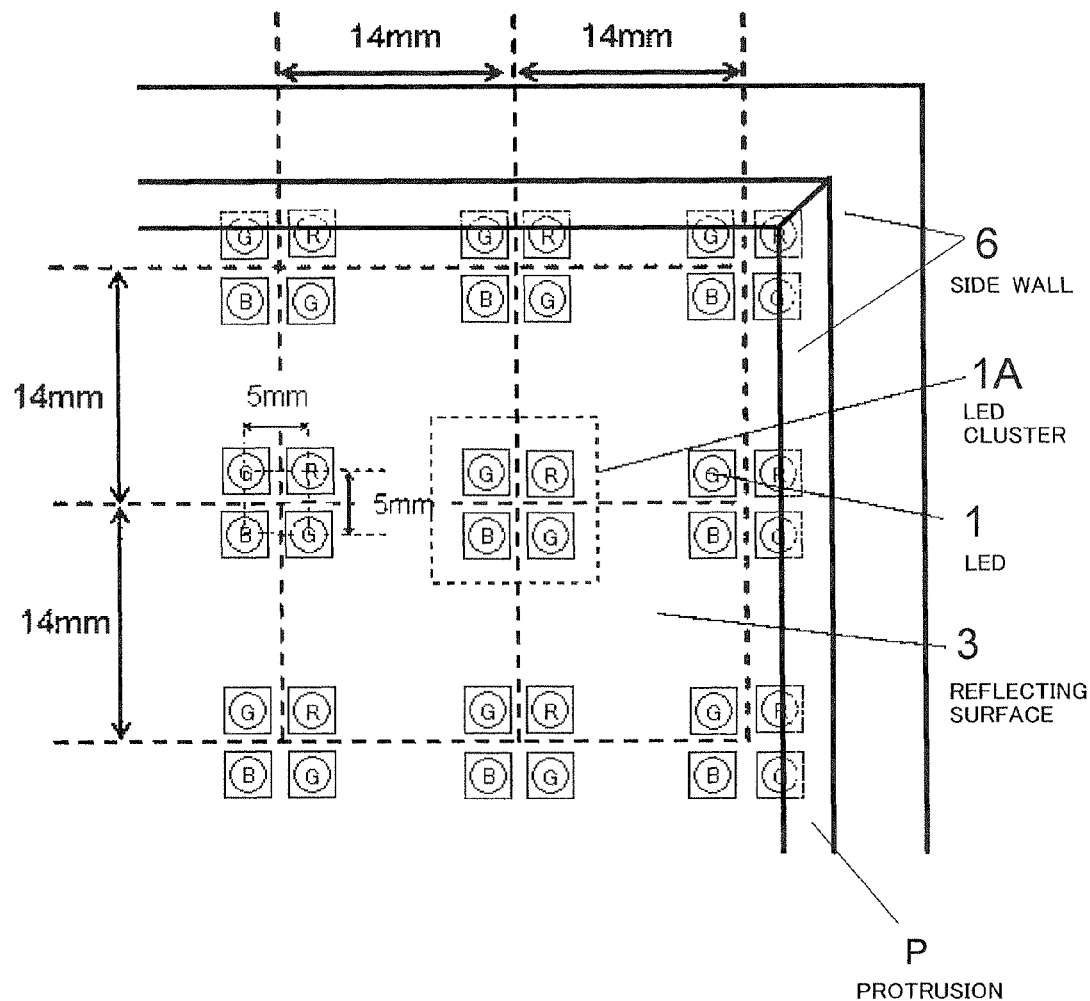
FIG. 4 is a partial plan view of the LED array used in the direct type LED backlight device according to the first embodiment of the present invention, where the LED array is seen from the display surface side (optical sheet side).

A direct type LED backlight device according to a first embodiment of the present invention is shown in FIGS. 3 and 4.

As shown in FIG. 3, the direct type LED backlight device according to the first embodiment of the present invention comprises a LED array formed by a plurality of LEDs 1, a mounting board 2, a set of optical members 8, a side wall 6, and a chassis 7.

The LED array is constituted by combining a plurality of LEDs 1 each emitting red (R), green (G) or blue (B) light and disposing the LEDs 1 on the inner surface of the mounting board 2 to have a predetermined layout. The LED array mixes the red, green, and blue light to generate white light. Here, each of the LEDs 1 is of the "top-view" type that which emits red, green, or blue light perpendicular to the package thereof.

The concrete structure of the LED array used in the first embodiment is shown in FIG. 4. As shown in FIG. 4, four LEDs 1 that emit respectively red, green, green, and blue light are arranged to form a square, constituting one cluster 1A. Regarding the arrangement of the LEDs 1, the two LEDs 1 each emitting green light are disposed at each side of the LED1 emitting red light, and the LED 1 emitting blue light is placed on a diagonal line of this cluster 1A penetrating through the LED1 emitting red light. The two LEDs 1 each emitting green light are placed on the other diagonal line of this cluster 1A. These LED clusters 1A are arranged at constant pitches to form a matrix on the mounting board 2, constituting the LED array as a whole. The pitch of the cluster 1A is set at an optimum value according to the necessary brightness.

A driver circuit and a controller circuit (both not shown) are mounted on the mounting board 2 in addition to the LED array. The mounting board 2 comprises a reflecting surface 3 for reflecting the light emitted from the LEDs 1. The reflecting surface 3 is formed on the inner surface of the mounting board 2 in such a way as to have the areas where the LEDs 1 are placed open.

The side wall 6 has a cylindrical shape whose two opposite ends are open, where the cross section of the cylindrical shape is approximately rectangular. The side wall 6 is fixed to the chassis 7 so as to surround the periphery (all sides) of the mounting board 2. One of the opening ends (the lower end in FIG. 3) of the side wall 6 is closed by the chassis 7, and the other opening end (the upper end in FIG. 3) is closed by the set of optical members 8. The mounting board 2 is fixed onto the inner surface of the bottom of the chassis 7. The chassis 7 is formed to surround both of the mounting board 2 and the side wall 7, resulting in a box-like shape whose upper surface is open.

The set of optical members 8 is constituted by a diffusion plate 4, and a set of optical sheets 5 including a diffusion sheet, a prism sheet and so on. The diffusion plate 4 is located at the innermost position (i.e., the nearest position to the mounting board 2). The set of optical sheets 5 is located outside the diffusion plate 4 and is adjacent to the diffusion plate 4. The set of optical members 8 is fixed to the opposite end (the upper end in FIG. 3) of the side wall 6 to the mounting board 2. In this way, each of the optical members 8 is held at predetermined distances from the reflecting surface 3.

The mounting board 2, the side wall 7 and the set of optical members 8 constitute an "optical mixing space" (optical mixing cavity) for optically mixing the different color light emitted from the LED array placed on the mounting board 2 with each other to generate white light. The mounting board 2 forms the bottom (i.e., the bottom wall) of the optical mixing space; however, the bottom wall of the optical mixing space may be formed by the bottom of the chassis 7. The set of optical members 8 forms the top (i.e., the top wall) of the optical mixing space.

As shown in FIG. 3, the inner surface 6f of the side wall 6 protrudes inwardly and obliquely within the range between the emission surfaces of the LEDs 1 and the inner surface (i.e., the light incidence surface) of the diffusion plate 4, resulting in a protrusion P on the inside of the side wall 6. Thus, the side wall 6 is tapered in cross section as a whole. In other words, the thickness of the side wall 6 increases gradually (here, approximately uniformly) from the side of the optical members 8 toward the side of the mounting board 2. For this reason, the end of the side wall 6 on the side of the mounting board 2 overlaps with part of the emission surfaces of the LEDs 1 which are located at the outermost positions in the LED array (these LEDs 1 will be termed the "outermost LEDs 1" below), and when a viewer sees the LED array from the side of the optical members 8 (along the direction perpendicular to the optical members 8), parts of the outermost LEDs 1 (i.e., the outer parts of the LEDs 1) are invisible. In other words, the parts of the emission surfaces of the outermost LEDs 1 are inserted into the rear of the side wall 6 to have such a shape as to be covered (or concealed) with the side wall 6. This state is shown in FIG. 4 more clearly.

Here, the protrusion P of the side wall 6 protrudes along a direction approaching the central part of the optical mixing space or cavity and has a function of blocking part of the light emitted from the outermost LEDs 1 to reach the set of optical members 8. The protrusion P includes not only (a) a part or parts superposed on the outermost LEDs 1 (which has a function of blocking the light emitted from the outermost LEDs 1 directly toward the set of optical members 8 to reach the optical members 8) but also (b) a part or parts that is/are located near the outermost LEDs 1 and that has/have a function of blocking the light emitted outward obliquely from the outermost LEDs 1 to reach the set of optical members 8.

Regarding the LEDs 1 aligned along the vertical (up and down) direction of FIG. 4, the red LED 1 and the green LED 1 correspond to the outermost LEDs 1; thus, the outer parts of the emission surfaces of these two LEDs 1 are concealed with (the protrusion P of) the side wall 6. Regarding the LEDs 1 aligned along the transverse (left and right) direction of FIG. 4 also, the red LED 1 and the green LED 1 correspond to the outermost LEDs 1 and thus, the outer parts of the emission surfaces of these two LEDs 1 are concealed with (the protrusion P of) the side wall 6.

At the end portion of the side wall 6 on the side of mounting board 2, a surface 6a which is continuous with the inner surface 6a and which is approximately parallel to the reflecting surface 3 is formed, and a surface 6b approximately perpendicular to the reflecting surface 3 is formed to be continuous with the surface 6a. The surface 6a is located near the "emission surfaces" of the outermost LEDs 1 and extended along these emission surfaces. The surface 6b is located near the "side faces" of the outermost LEDs 1 and extended along these side faces to the vicinity of the surface of the mounting board 2. A minute gap exists between the surface 6a and the emission surface of each outermost LED 1 and therefore, they are not in contact with each other. Similarly, a minute gap exists between the surface 6b and the side face of each outermost LED 1 and therefore, they are not in contact with each other.

At the end portion of the side wall 6 on the side of optical members 8, a supporting surface 6c which is approximately parallel to the reflecting surface 3 (the mounting board 2) is formed. The diffusion plate 4 is in contact with the support surface 6c and is supported by the same surface 6c.

Since the inner surface 6f of the side wall 6 protrudes inward and obliquely, the intersection 6e of the surface 6a and the inner surface 6f of the side wall 6 on the side of the mounting board 2 is shifted inward along the board 2 with respect to the intersection 6d of the support surface 6c and the inner surface 6f on the side of the optical members 8. The intersection 6e forms a top end or tip of the inner surface 6f or the protrusion P.

As shown in FIG. 6A, an inner surface 6f' of the conventional side wall 6' which does not have a protrusion protruding inward is approximately perpendicular to the reflecting surface 3 within the range between the emission surfaces of the LEDs 1 and the inner surface of the diffusion plate 4. Moreover, the thickness of the side wall 6' is uniform within the range between the emission surfaces of the LEDs 1 and the inner surface of the diffusion plate 4. The conventional side wall 6' is apparently different from the side wall 6 according to the first embodiment of the invention described here at these points.

A liquid crystal panel 9 is fitted to the emission surface side (i.e., in the vicinity of the optical members 8) of the direct type LED backlight device according to the first embodiment having the above-described structure, in which the panel 9 is fixed to be parallel to the optical members 8. In this way, a liquid crystal display (LCD) according to the first embodiment is obtained.

Next, appropriate positional and dimensional relationships of the respective constituents in the direct type LED backlight device according to the first embodiment will be explained below with reference to FIGS. 4 and 5.

As shown FIG. 4, it is preferred that the pitch of the clusters 1A constituting the LED array (i.e., the center-to-center distance between the adjacent clusters 1A) is, for example, 14 mm (or greater).

The red, green or blue LED 1 included in the cluster 1A has a middle power whose forward current is approximately 100 mA and a package size of a degree of 3 mm to 5 mm. Four of these LEDs 1 are closely disposed together at intervals of approximately 5 mm to constitute the cluster 1A.

Figure 5:
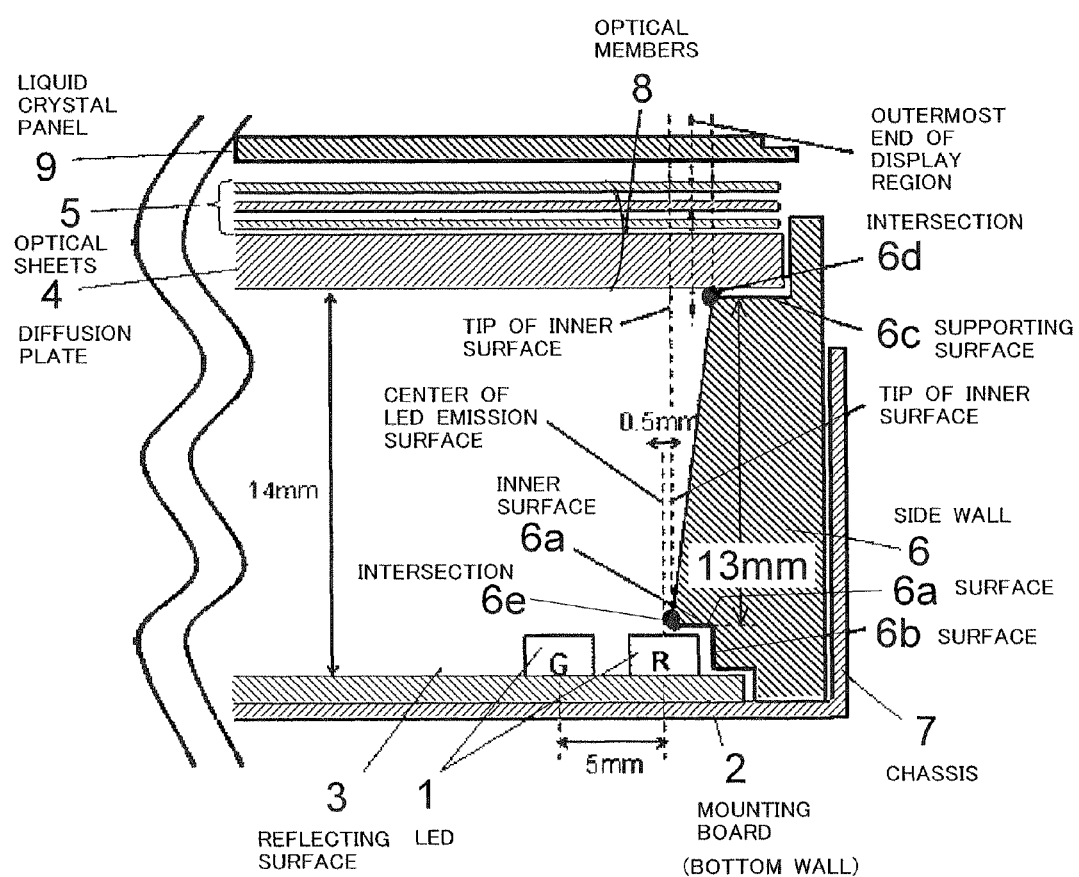
FIG. 5 is a cross-sectional view showing the detailed dimensions of the main part and the positional relationship with the liquid crystal panel of the direct type LED backlight device according to the first embodiment of the present invention.

As shown in FIG. 5, the distance from the reflecting surface 3 to the inner surface (i.e., the light incidence surface) of the diffusion plate 4 included in the set of optical members 8 is preferably set at 14 mm. As described previously, the side wall 6 that holds this distance protrudes inward so as to conceal partially the LEDs 1 along the mounting board 2 at a height that the side wall 6 does not contact the emission surfaces of the LEDs 1 at the outermost positions in the LED array within the range between the emission surfaces of the LEDs 1 and the inner surface of the diffusion plate 4. The height of the emission surfaces of the LEDs 1 is set at approximately 1 mm from the inner surface of the mounting board 2 (i.e., the reflecting surface 3). The tip of the protruded part (i.e., the protrusion P) of the side wall 6, in other words, the intersection 6e of the surface 6a and the inner surface 6f is preferably set to be close to the emission surfaces of the LEDs 1 at a height that this tip (i.e., the intersection 6e) does not contact the emission surfaces of the LEDs 1; specifically, the distance of the tip of the protrusion P (i.e., the intersection 6e) from the supporting surface 6c supporting the diffusion plate 4 is preferably less than 13 mm.

Preferably, the tip of the protruded part (i.e., the protrusion P) of the side wall 6, in other words, the intersection 6e of the surface 6a and the inner surface 6f is set at a position where the intersection 6e is shifted by 0.5 mm along the mounting board 2 from the centers of the emission surfaces of the outermost LEDs 1 toward the side wall 6 (i.e., outwardly). In this way, such a structure that (the protrusion P of) the side wall 6 does not conceal the whole emission surfaces of the outermost LEDs 1 is realized.

Here, the surface 6a of the side wall 6 which is parallel to the reflecting surface 3 and the surface 6b which is continuous with the surface 6a and which is perpendicular to the reflecting surface 3 have an optical characteristic that does not reflect light (i.e., non-reflection characteristic), in other words, an optical characteristic that absorbs light (i.e., absorption characteristic). A surface having such the optical characteristic as described here can be easily realized by, for example, attaching a known light shielding tape that absorbs light. The other surfaces except for these two surfaces 6a and 6b are all colored white to have a diffuse reflection characteristic.

The position of each outermost end of the display region of the liquid crystal panel 9 along a direction parallel to the mounting board 2 is determined in such a way as to be located between the intersection line 6d (on the side of the diffusion plate 4) of the supporting surface 6c and the inner surface 6f and the intersection line 6e (on the side of the mounting board 2) of the surface 6a and the inner surface 6e. By disposing each outermost end of the display region of the panel 9 at such the position as describe here, the picture frame region that surrounds the display region of the panel 9 does not increase even if the thickness of the side wall 6 becomes large due to the protrusion P. For this reason, large brightness lowering can be prevented from occurring in the periphery of the display region of the panel 9 and as a result, picture frame narrowing is made possible.

Next, the operation of the backlight device according to the first embodiment having the aforementioned structure will be explained below.

Each of the LEDs 1 emits red, green or blue light that has been adjusted to generate desired chromaticity in the backlight device. The light thus emitted from each LED 1 enters the diffusion plate 4 by way of the inside of the optical mixing space whose constant distance (height) is held maintained by the side wall 6. The light that has reached the inner surface 6$f$ of the side wall 6 on its way to the diffusion plate 4 is reflected by the inner surface 6$f$ and sent toward the diffusion plate 4. Part of the light that has gone into the diffusion plate 4 passes through the set of optical members 8, i.e., the diffusion plate 4 and the set of optical sheets 5 (e.g., the diffusion sheet, the prism sheet, and so on), and is emitted toward the liquid crystal panel 9. The light thus emitted from the backlight device will go into the liquid crystal panel 9 as backlight.

The light that has gone into the diffusion plate 4 but has not passed through the set of optical members 8 is reflected or refracted by the diffusion plate 4 and/or the optical sheets 5 and returned to the inside of the optical mixing space. Then, this light is reflected by the reflecting surface 3 on the mounting surface 2 and/or the inner surface 6$f$ of the side wall 6 and sent toward the diffusion plate 4 again. Thereafter, this light passes through the set of optical members 8 and finally, is emitted toward the liquid crystal panel 9. The light thus emitted from the backlight device in this way also goes into the panel 9 as backlight.

In the optical mixing space formed by the mounting board 2, the side wall 6, and the optical members 8, the emission surfaces of the outermost LEDs 1 are partially concealed with the two surfaces 6$a$ and 6$b$ which are formed on the protrusion P of the side wall 6. Since both of the surfaces 6$a$ and 6$b$ have a non-reflection characteristic here, part of the whole luminous flux emitted from the outermost LEDs 1 is absorbed by the surfaces 6$a$ and 6$b$. As a result, the amount of the light emitted from the outermost LEDs 1 is less than that emitted from the other LEDs 1 adjacent to the outermost LEDs 1 and therefore, color unevenness occurring on the periphery of the display region of the liquid crystal panel 9 is improved.

With the direct type LED backlight device according to the first embodiment of the present invention, as explained above, the side wall 6 comprises on its inside the protrusion P protruding toward the central portion of the optical mixing space which is formed by the mounting board 2 (the bottom wall), the side wall 6, and the set of optical members 8. Moreover, the at least part of the emission surfaces of the outermost LEDs 1 are overlapped with the protrusion P and located at such the positions as to be invisible when seen along the direction perpendicular to the optical members 8. Therefore, the light emitted from the outermost LEDs 1 the at least part of the emission surfaces of which are overlapped with the protrusion P can be made not to reach the set of optical members 8 partially.

Figure 2:
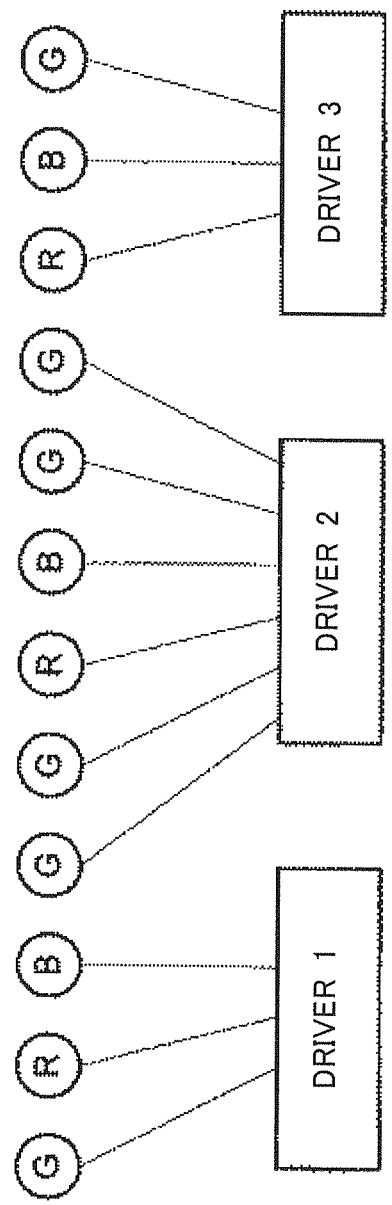
FIG. 2 is a conceptual view showing the driving method of the conventional direct type LED backlight device shown in FIG. 1.

For this reason, color unevenness occurring on the periphery of the display region of the liquid crystal panel 9 can be improved only by setting or adjusting appropriately the protruding condition of the protrusion P and the color and quantity of the light that is blocked by the protrusion p, without taking any measure such as changing the driving currents as used in the conventional backlight device shown in FIGS. 1 and 2.

Furthermore, the driver and its control circuit are not increased and the contour of a LCD (e.g., the width of the picture frame) is not changed for color unevenness improvement.

In this way, the direct type LED backlight device according to the first embodiment of the present invention has an advantage that color unevenness on the periphery of the display region can be improved without increase of the driver and its control circuit and change of the contour (e.g., the width of the picture frame) of a LCD.

The inventor confirmed the advantage or effect of the direct type LED backlight device according to the first embodiment by doing simulations. The result of the simulations will be explained below with reference to FIGS. 6A, 6B, 7A, and 7B.

Figure 6B:
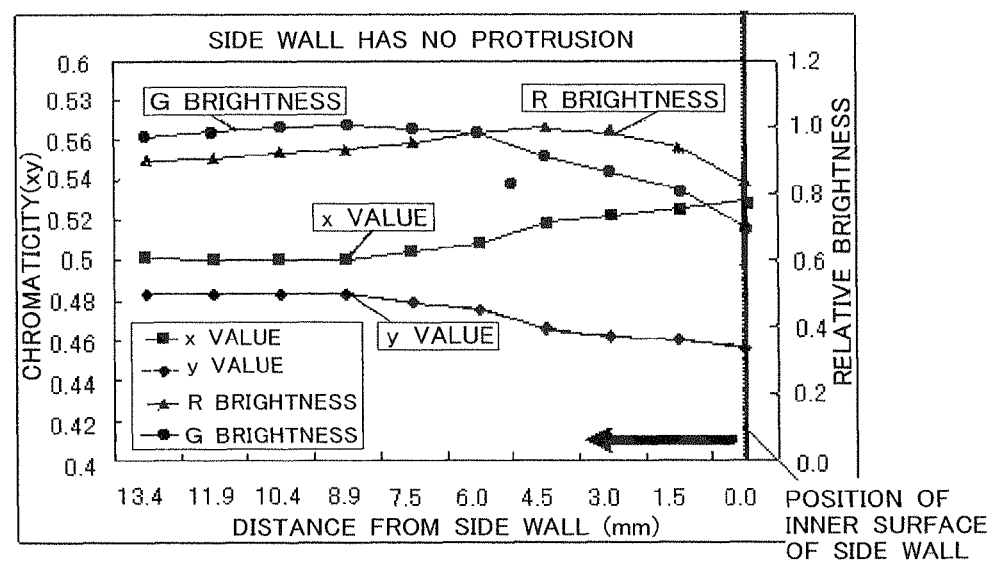
FIG. 6B is a graph showing the optical characteristics of the direct type LED backlight device having the structure of FIG. 4A, wherein the graph was obtained by simulation.
Figure 7A:
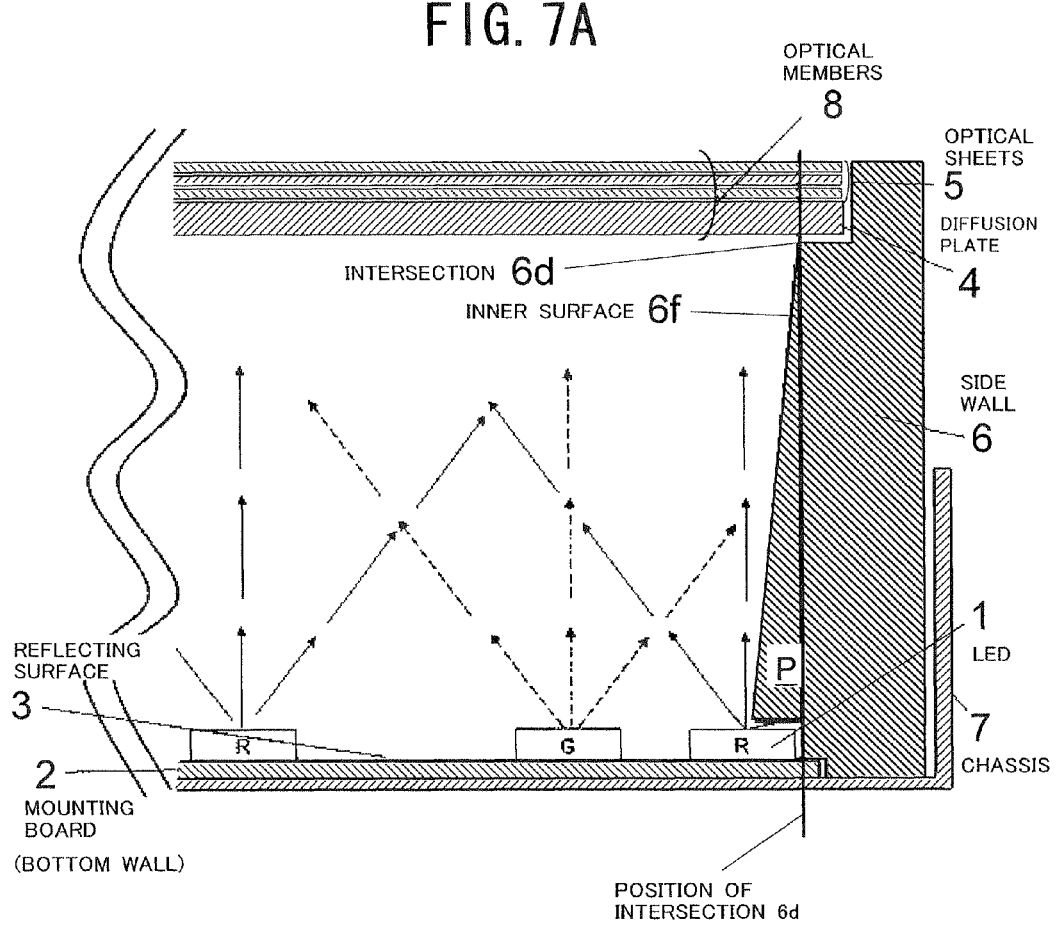
FIG. 7A is a cross-sectional view showing the structure of the main part of the direct type LED backlight device according to the first embodiment of the present invention.
Figure 7B:
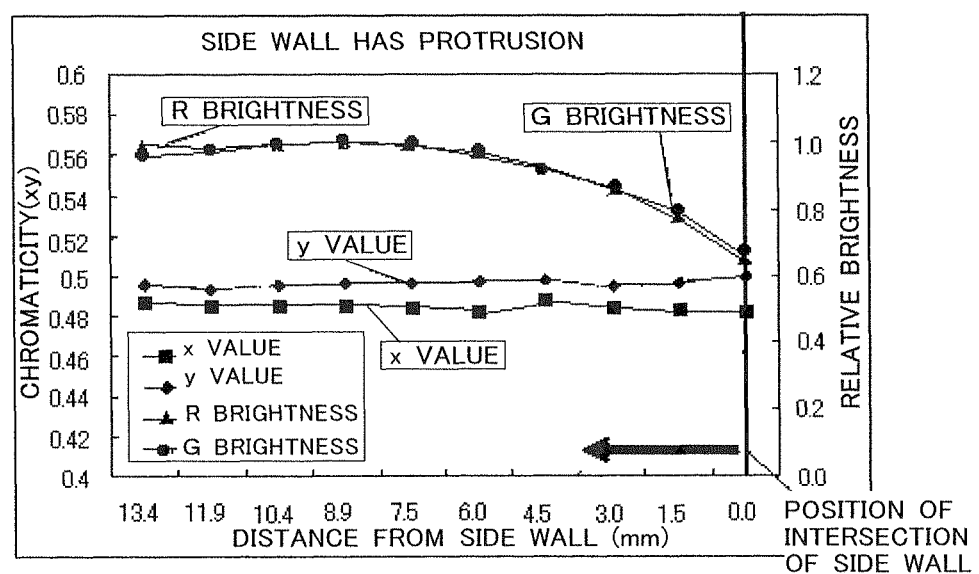
FIG. 7B is a graph showing the optical characteristics of the direct type LED backlight device according to the first embodiment of the present invention, obtained by simulation.

FIG. 6A is a cross-sectional view showing the structure of the main part of a conventional direct type LED backlight device whose side wall comprises no protrusion. FIG. 6B shows the optical characteristics of the LED backlight device having the structure of FIG. 6A, which was obtained by inventor's simulation. FIG. 7A is a cross-sectional view showing the structure of the main part of the direct type LED backlight device according to the first embodiment of the present invention. FIG. 7B shows the optical characteristics of the direct type LED backlight device according to the first embodiment of the present invention, which was obtained by inventor's simulation.

Generally, with a direct type LED backlight device, in the central region corresponding to the central part of the display region of the liquid crystal panel 9, the light emitted from each LED cluster 1A and the light reflected in the optical mixing space or cavity to reach the same central region are mixed to have a desired chromaticity value. In the peripheral region corresponding to the peripheral part of the display region of the panel 9, however, the light reflected in the optical mixing space or cavity to reach the peripheral region is less in quantity than that to reach the central region. Therefore, an obtainable chromaticity value in the peripheral part of the display region is largely dependent on the LED clusters 1A arranged in the same region. In a case where the red, green and blue LEDs 1 are used, since the emission peaks are shifted due to shift of the arrangement positions of the LEDs 1 of the respective colors, the emitted light distribution from the outermost LEDs 1 and that from the LEDs 1 which are inwardly adjacent to the outermost LEDs 1 are different from each other. For this reason, the values of relative brightness and the x and y values of chromaticity deviate from their desired values largely. This is clearly shown in FIG. 6B.

Specifically, as shown in FIG. 6B, the relative brightness of green light (G relative brightness) and the relative brightness of red light (R relative brightness) fluctuate largely as the distance from the inner surface 6$f$ of the side wall 6 increases. At the positions nearer to the central portion of the optical mixing space, G relative brightness is greater than R relative brightness; however, at the position whose distance is approximately 6.0 mm from the inner surface 6$f$, G relative brightness accords with R relative brightness. At the positions nearer to the side wall 6, this relationship is turned upside down and R relative brightness is greater than G relative brightness.

Regarding the x and y values of chromaticity, the x value is larger than the y value, and the difference between the x and y values increases furthermore in the range whose distance from the inner surface 6$f$ of the side wall 6 is less than approximately 6.0 mm.

As a result, with the backlight device of FIG. 6A whose side wall 6' comprises no protrusion on its inner surface 6$f'$, since the mixing ratio of the red, green and blue light in the peripheral part of the optical mixing space is different from that in the central part of the optical mixing space, the quantity of the light from the outermost LEDs 1 is relatively larger. Thus, "color unevenness" occurs on the periphery of the display region. This phenomenon will be conspicuous if the cavity thickness (which is 14 mm in this embodiment) of the backlight device is thinned and/or the arrangement pitch (which is 5 mm in this embodiment) of the LEDs 1 of the respective colors in the LED cluster 1A is enlarged.

On the contrary, with the backlight device of FIG. 7A according to the first embodiment of the invention, the emitted light distribution from the outermost LEDs 1 and that from the LEDs 1 which are inwardly adjacent to the outermost LEDs 1 can be accorded with each other by partially absorbing the light emitted from the outermost LEDs 1 with the surfaces 6a and 6b of the protrusion P of the side wall 6. In this case, the mixing ratio of the respective color light from the respective LEDs 1 in the peripheral part of the optical mixing space is equivalent to that in the central part of the optical mixing space, which means that "color unevenness" on the periphery of the display region of the liquid crystal panel 9 is improved. This appears in FIG. 7B clearly.

Specifically, as shown in FIG. 7B, G relative brightness and R relative brightness are approximately in accordance with each other over the whole range shown in FIG. 7B. In addition, G relative brightness and R relative brightness are approximately in accordance with each other over the whole range shown in FIG. 7B from the position near the central part of the optical mixing space to the end of the same space, and the fluctuation of G and R relative brightness is also small. Regarding the x and y values of chromaticity, the x value is slightly larger than the y value, and the difference between the x and y values is approximately constant over the whole range shown in FIG. 7B.

As a result, with the backlight device of FIG. 7A according to the first embodiment of the present invention, the mixing ratio of the red, green and blue light in the peripheral part of the optical mixing space is approximately in accordance with that in the central part of the optical mixing space. Thus, "color unevenness" does not occur on the periphery of the display region. This will be the same if the cavity thickness (which is 14 mm in this embodiment) of the backlight device is thinned and/or the arrangement pitch (which is 5 mm in this embodiment) of the LEDs 1 of the respective colors in the LED cluster 1A is enlarged.

In addition, the LED array used in the aforementioned simulation has the configuration of FIG. 4. Specifically, as shown in FIG. 4, four LEDs 1 emitting respectively red, green, green and blue (R, G, G, B) light are arranged to form a square, constituting one cluster 1A. Regarding the arrangement of the LEDs 1 in the cluster 1A, two green LEDs 1 are disposed at each side of the red LED 1, and the blue LED 1 is placed on one diagonal line of the cluster 1A penetrating through the red LED 1. Two green LEDs 1 are placed on the other diagonal line of the cluster 1A. However, the present invention is not limited to this arrangement.

Furthermore, in the first embodiment, each outermost end of the display region of the liquid crystal panel 9 is positioned in such a way as to be located between the corner (i.e., the intersection line 6d) of the supporting surface 6c of the side wall 6 and the tip (i.e., the intersection line 6e) of the protrusion P. However, each outermost end of the display region may be located at a position superposing on the corner (i.e., the intersection line 6d) of the supporting surface 6c if the picture frame of the panel 9 has a margin or room. Briefly speaking, it is sufficient for the present invention that each outermost end of the display region of the panel 9 is located on the corner of the supporting surface 6c (i.e., the intersection line 6d) or at any position nearer to the center of the display region than this corner.

Since a LCD according to the first embodiment of the present invention is constituted by combining the aforementioned direct type LED backlight device with the liquid crystal panel 9, it is apparent that this LCD has the same advantage as that of this backlight device.

Second Embodiment

Figure 8:
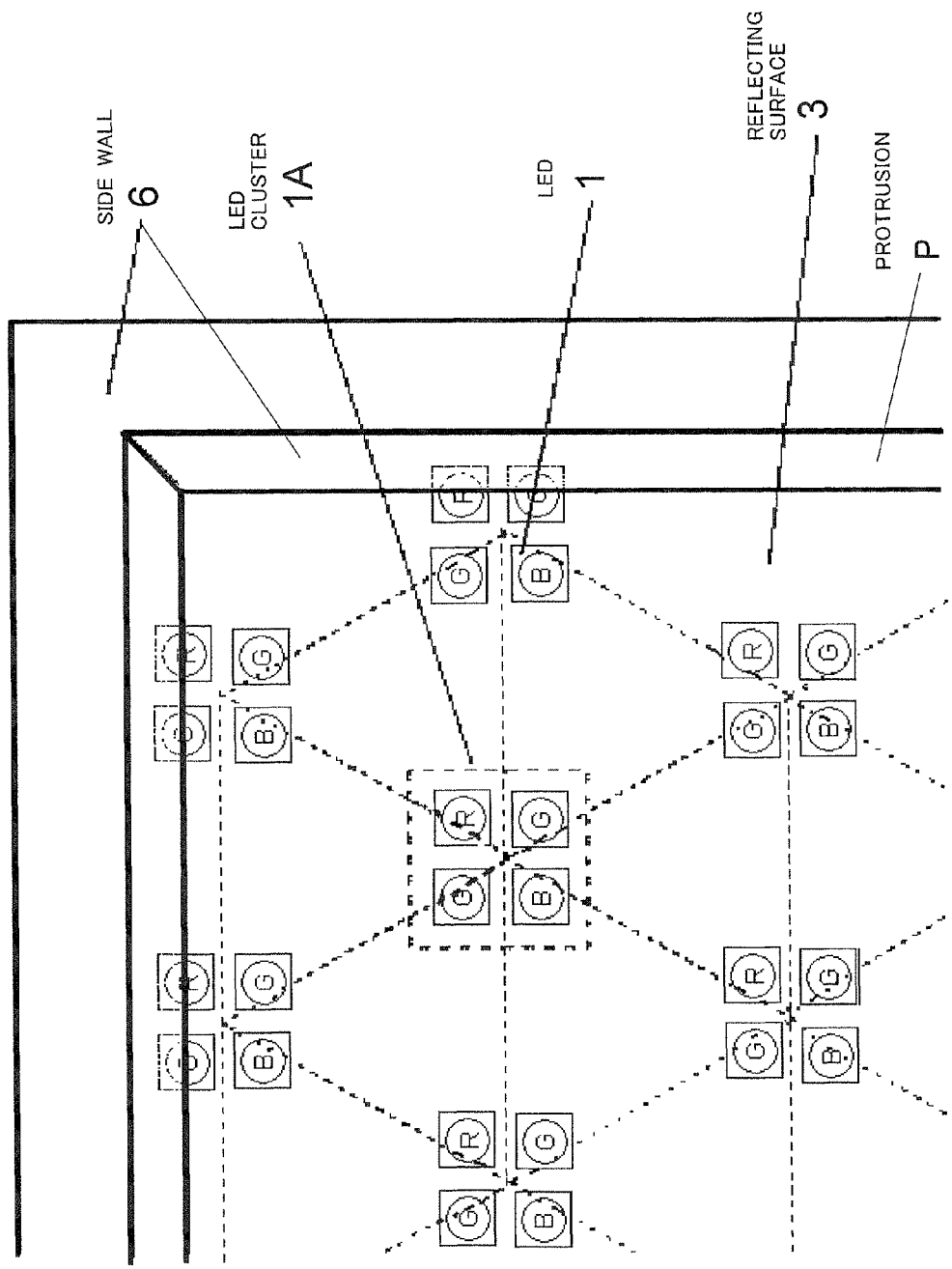
FIG. 8 is a partial plan view of the LED array used in a direct type LED backlight device according to a second embodiment of the present invention, where the LED array is seen from the display surface side (optical sheet side).

FIG. 8 is a partial plan view showing the structure of the LED array used in a direct type LED backlight device according to a second embodiment of the present invention, where the LED array is seen from their emission surface side (i.e., the side of the optical sheets 8).

With the second embodiment, as shown in FIG. 8, the LED clusters 1A have a staggered layout or pattern. The second embodiment is different from the aforementioned first embodiment at this point. The other structure of the second embodiment is the same as the first embodiment.

Since the LED cluster 1A has a staggered layout, the distance between the adjoining clusters 1A can be made constant. In addition, since the distance between the clusters 1A is constant, the respective color light from the respective LEDs 1 is well mixed with each other to have a good balance within the overall backlight device according to the second embodiment. Accordingly, with the backlight device according to the second embodiment, color unevenness can be more reduced than the aforementioned direct type LED backlight device according to the first embodiment in the entire display region.

Third Embodiment

Figure 9:
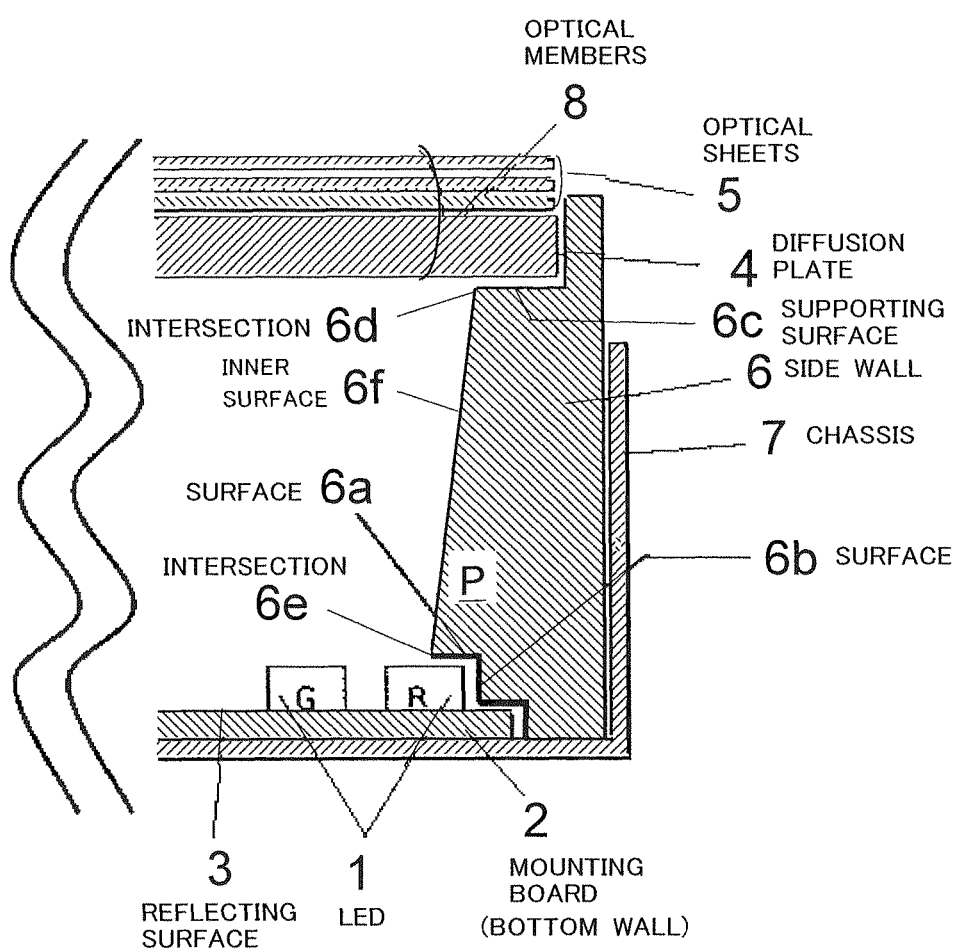
FIG. 9 is a cross-sectional view showing the structure of the main part of a direct type LED backlight device according to a third embodiment of the present invention.

FIG. 9 is a cross-sectional view showing the structure of the main part of a direct type LED backlight device according to a third embodiment of the present invention.

As shown in FIG. 9, in the third embodiment, although the structure itself of the backlight device is the same as that of the aforementioned first embodiment, the optical characteristic of the surfaces 6a and 6b of the side wall 6, which are located on the side of the mounting board 2, is different. Specifically, in the first embodiment, the surface 6a which is parallel to the reflecting surface 3 of the side wall 6, and the surface 6b which is continuous to the surface 6a and perpendicular to the reflecting surface 3 have a non-reflective characteristic (i.e., an optical absorption characteristic). On the contrary, in the third embodiment, the surface 6a has a reflection characteristic and the surface 6b has an optical absorption characteristic. The other structure is the same as the above-described first embodiment.

The optical characteristic combination of the surfaces 6a and 6b is not limited to the one described in the third embodiment, and any other type of combination may be adopted. For example, the surface 6a may have an optical absorption characteristic and the surface 6b may have a reflection characteristic. Both of the surfaces 6a and 6b may have a reflection characteristic.

The characteristic (e.g., optical absorption, reflection, and so on) itself may be changed. For example, a diffuse reflection characteristic may be given to the surface(s) 6a and/or 6b by coloring it/them white, and a specular reflection characteristic may be given to it/them.

The direct type LED backlight device according to the third embodiment has an advantage that even after the side wall 6 is produced, brightness distribution can be finely adjusted by adjusting the optical characteristic of the surfaces 6a and 6b, in addition to the same advantage as that of the aforementioned first embodiment.

Fourth to Sixth Embodiments

Figure 10:
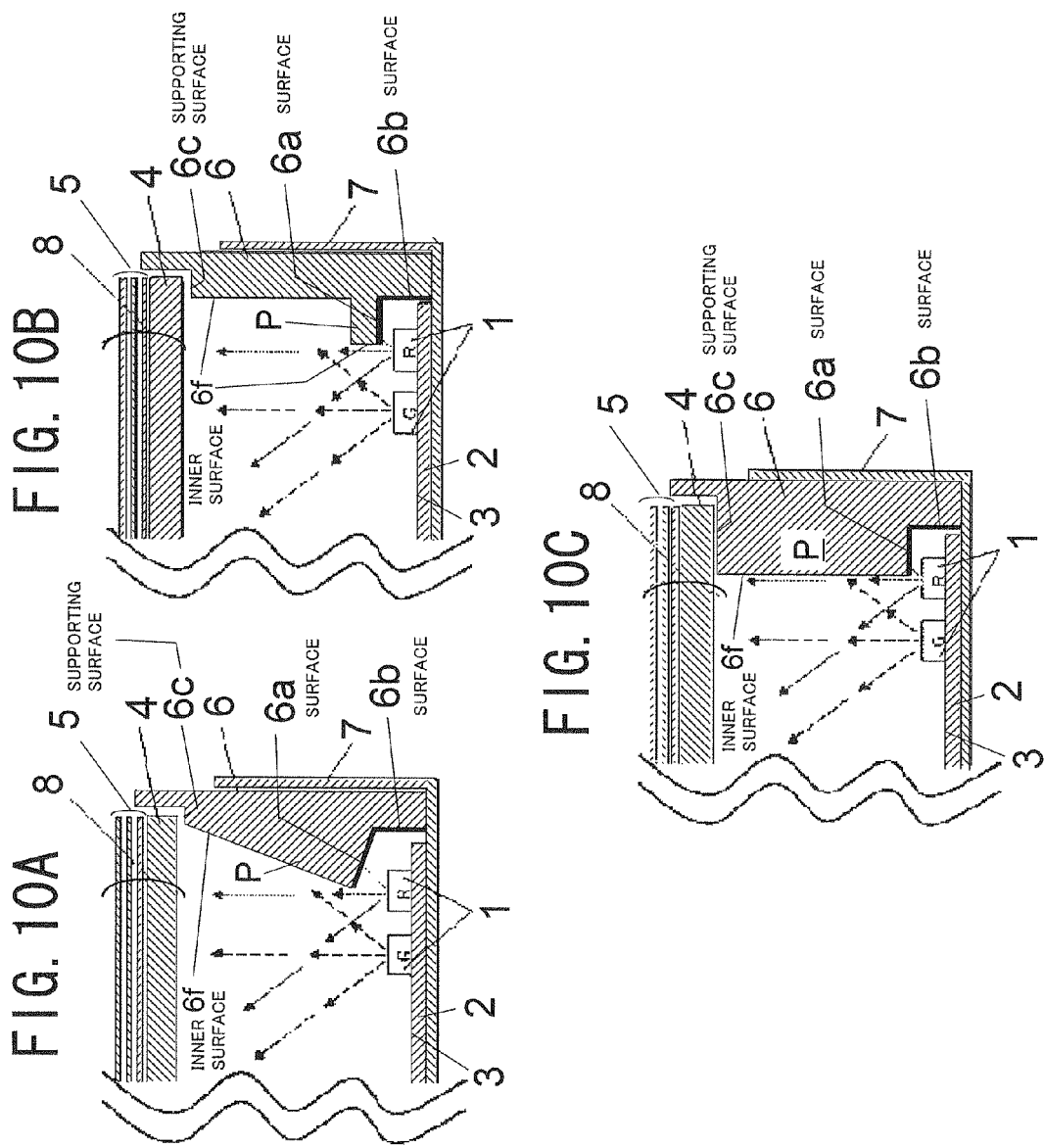
FIG. 10A is a cross-sectional view showing the structure of the main part of a direct type LED backlight device according to a fourth embodiment of the present invention.
FIG. 10B is a cross-sectional view showing the structure of the main part of a direct type LED backlight device according to a fifth embodiment of the present invention.
FIG. 10C is a cross-sectional view showing the structure of the main part of a direct type LED backlight device according to a sixth embodiment of the present invention.

FIGS. 10A, 10B and 10C are cross-sectional views showing the structures of the main parts of direct type LED backlight devices according to fourth to sixth embodiments of the present invention, respectively.

The fourth to sixth embodiments correspond to variations of the side wall 6 in the aforementioned first embodiment. It is sufficient for the side wall 6 that the inner surface 6f includes the protrusion P protruded toward the central part of the optical mixing space or cavity along the mounting board 2, and that the at least part of the emission surfaces of the outermost LEDs 1 are overlapped with the protrusion P and located at such positions as to be invisible when seen along a direction perpendicular to the set of optical members 8. Therefore, the side wall 6 may have various profiles in cross section.

With the direct type LED backlight device according to the fourth embodiment, as shown in FIG. 10A, the surface 6a, which is parallel to the mounting board 2 in the aforementioned first embodiment, is inclined to the emission surfaces of the LEDs 1 with respect to the mounting board 2.

With the direct type LED backlight device according to the fifth embodiment, as shown in FIG. 10B, the inner surface 6f, which is entirely inclined with respect to the mounting board 2 in the aforementioned first embodiment, comprises the protrusion P having a rectangular cross section. This protrusion P is selectively formed in the vicinity of the LED array, and the part of the protrusion P located nearer to the optical members 8 than the protrusion P is removed. The cross sectional shape of the protrusion P and the cross sectional shape of the removed part of the protrusion P are optionally changeable.

With the direct type LED backlight device according to the sixth embodiment, as shown in FIG. 10C, the inner surface 6f, which is entirely inclined with respect to the mounting board 2 in the aforementioned first embodiment, is perpendicular to the mounting board 2. The protrusion P, which is located nearer to the optical members 8 than the surface 6a, has the same thickness entirely. When the picture frame of the LCD has a margin or room with respect to the end position of the display region, the structure shown in FIG. 10C may be taken.

It is apparent for the direct type LED backlight devices according to the fourth to sixth embodiments to have the same advantage as that of the direct type LED backlight devices according to the aforementioned first embodiment.

Seventh Embodiment

Figure 11:
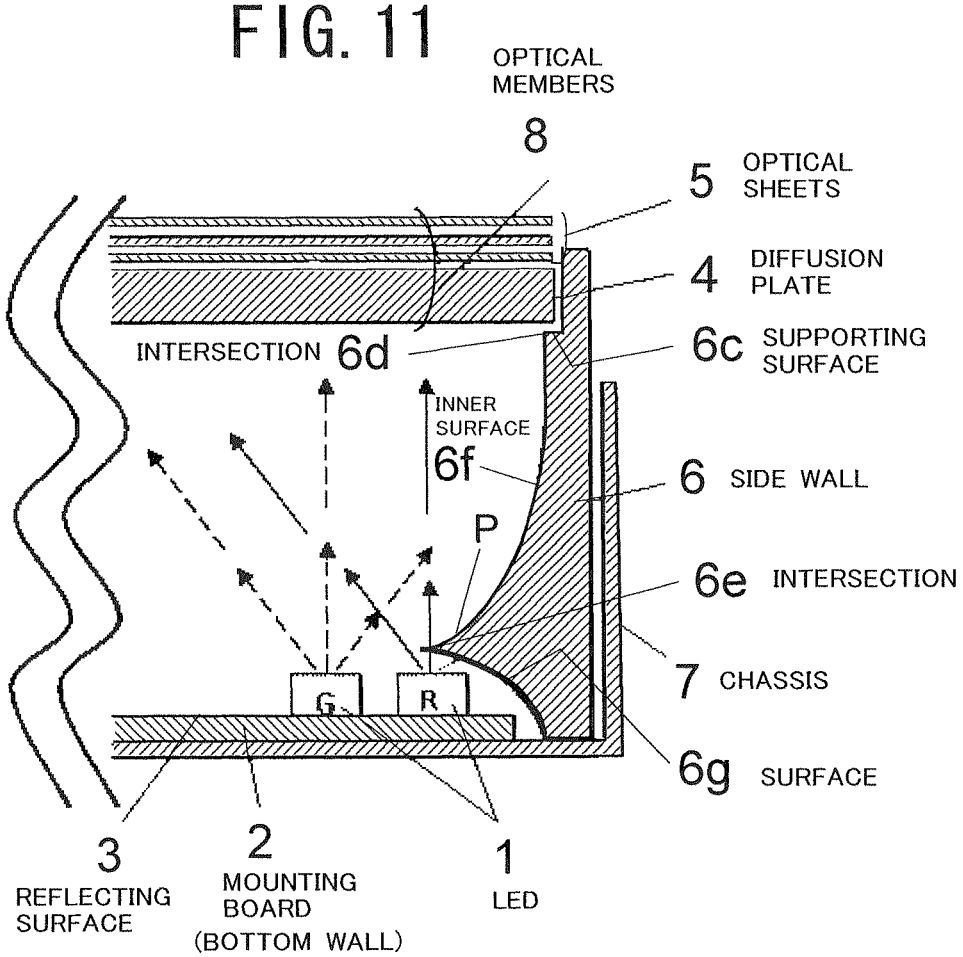
FIG. 11 is a cross-sectional view showing the structure of the main part of a direct type LED backlight device according to a seventh embodiment of the present invention.

FIG. 11 is a cross-sectional view showing the structure of the main part of a direct type LED backlight device according to a seventh embodiment of the present invention.

The seventh embodiment has the structure that the protrusion P of the inner surface 6f of the side wall 6 is formed by curved surfaces. This structure corresponds to one obtained by forming the protrusion P of the direct type LED backlight device of the fifth embodiment shown in FIG. 10B with two depressed curved surfaces, and making the top end of the protrusion P sharp.

With the backlight device according to the seventh embodiment, the surface 6a which is parallel to the mounting board 2 and the surface 6b which is perpendicular to the board 2 in the aforementioned first embodiment are changed to one depressed curved surface 6g. The inner surface 6f is also depressed and curved.

With the direct type LED backlight device according to the seventh embodiment also, the same advantage as that of the aforementioned first embodiment is obtained. Moreover, in addition to this advantage, there is another advantage that brightness distribution can be finely adjusted by changing the curving states of the surfaces 6f and 6g to thereby adjust the direction of the specular reflection component of the light which is diffuse-reflected by the side wall 6.

The aforementioned shapes of the protrusion P of the side wall 6 and the aforementioned shapes of the inner surfaces thereof in the first to seventh embodiments may be optionally combined with each other according to the necessity.

Eighth Embodiment

Figure 12:
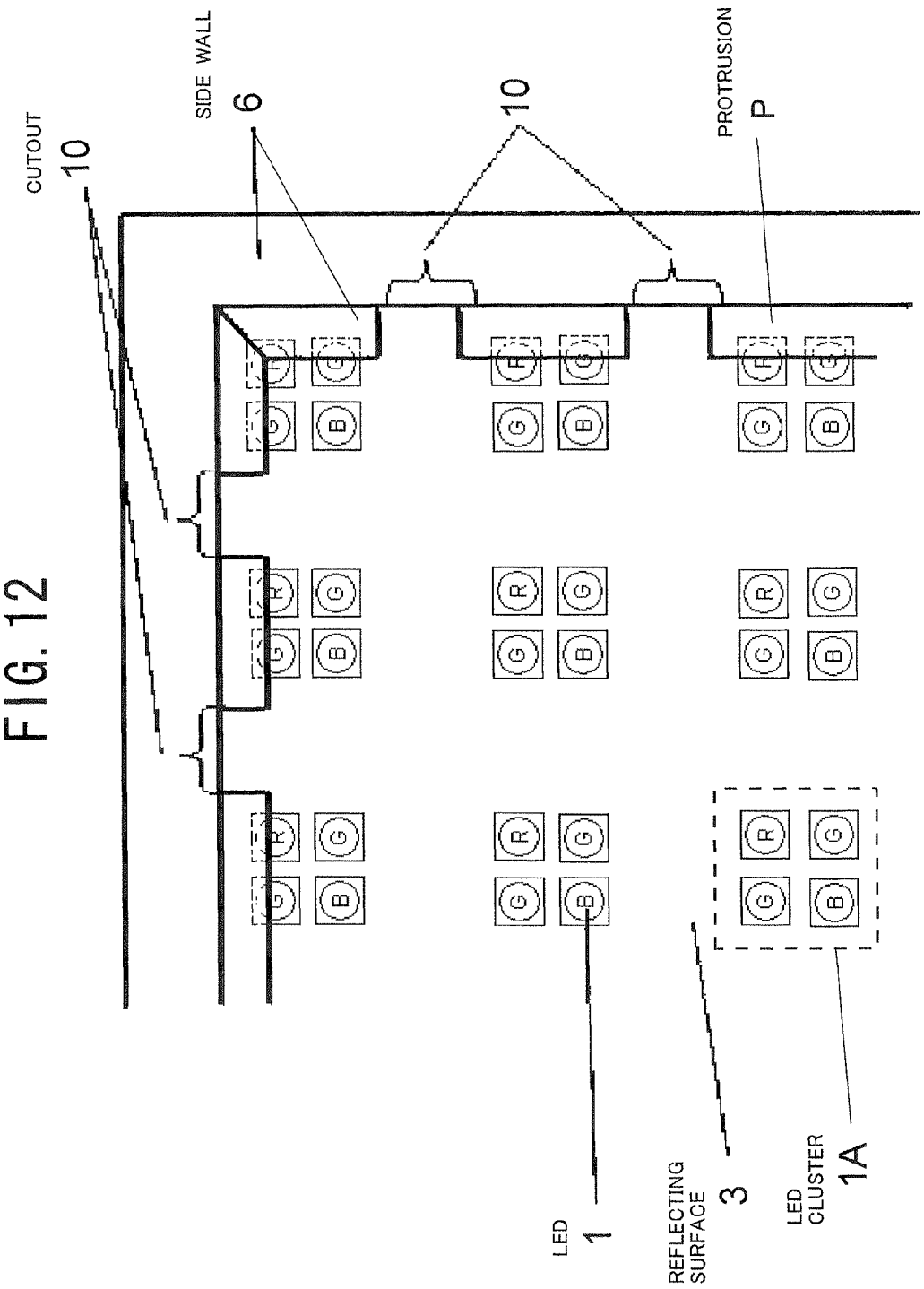
FIG. 12 is a partial plan view of the LED array used in a direct type LED backlight device according to an eighth embodiment of the present invention, where the LED array is seen from the display surface side (optical sheet side).

FIG. 12 is a partial plan view of the LED array used in a direct type LED backlight device according to an eighth embodiment of the present invention, where the LED array is seen from the emission surface side.

As shown in FIG. 12, the eighth embodiment is different from the aforementioned first embodiment in that the side wall 6 is selectively cut away to have a plurality of cutouts or opening 10, each of which is disposed between the adjoining LED cluster 1A. The other structure is the same as the above-described first embodiment.

In the region between the adjoining LED clusters 1A, the light from the LEDs 1 is difficult to reach the optical members 8. For this reason, there arises an anxiety that the light from the outermost LEDs 1 is more difficult to reach the members 8 because the protrusion P is provided on the side wall 6. To eliminate such the anxiety, the protrusion P is selectively cut away to form the cutouts 10 at the respective positions between the adjoining LED clusters 1A in the eighth embodiment. Providing the cutouts 10 creates a state equal to that the protrusion P does not exist in the respective regions between the adjoining LED clusters 1A and therefore, the anxiety that the light from the outermost LEDs 1 is difficult to reach the optical members 8 due to the protrusion P will not arise.

With the direct type LED backlight device according to the eighth embodiment also, the same advantage as that of the aforementioned first embodiment is obtained. Moreover, in addition to this advantage, there is another advantage that color unevenness can be prevented from occurring even when sufficient margin for brightness unevenness is not allowable from the viewpoint of the cavity thickness of the backlight device due to limitation of the pitch between the LED clusters 1A.

Ninth Embodiment

Figure 13:
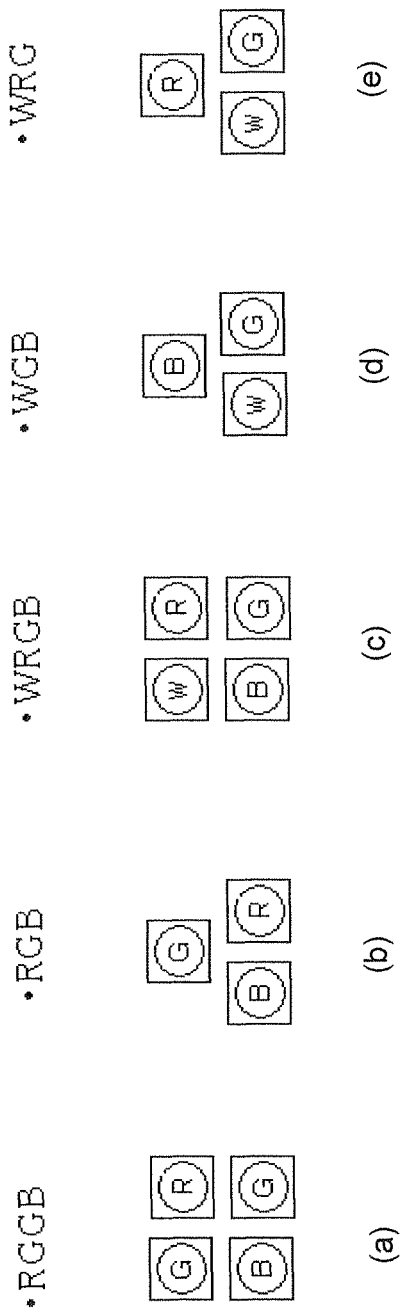
FIG. 13 is an explanatory view showing an example of the structure of the LED array used in a direct type LED backlight device according to a ninth embodiment of the present invention.

FIG. 13 is a plan view showing the structure of the LED array used in a direct type LED backlight device according to a ninth embodiment of the present invention.

As shown in FIG. 13, in the ninth embodiment, various combinations of the LEDs 1 in the LED cluster 1A are possible according to the purpose or use of the display device.

The combination of (a) is of the RGGB type, and includes four LEDs 1, wherein one LED emits red light, two LEDs emit green light, and the remaining one LED emit blue light. This type is suitable to the purpose necessitating high brightness and wide range of chromaticity. This combination is used in the aforementioned first embodiment.

The combination of (b) is of the RGB type, and includes three LEDs 1 emitting red, green, and blue light. This type is suitable to the purpose necessitating low brightness and wide range of chromaticity.

The combination of (c) is of the WRGB type, and includes four LEDs 1 emitting white, red, green, and blue light. This type is suitable to the purpose necessitating high efficiency and low power consumption.

The combination of (d) is of the WGB type, and includes three LEDs 1 emitting white, green, and blue light. This type is suitable to the purpose necessitating chromaticity adjustment within a specific chromaticity range only, high efficiency, and low power consumption.

The combination of (e) is of the WRG type, and includes three LEDs 1 emitting white, red, and green light. This type is also suitable to the purpose necessitating chromaticity adjustment within a specific chromaticity range only, high efficiency, and low power consumption.

In this way, the characteristics of the backlight device are changed according to the combination of the LEDs 1 in the LED cluster 1A. The invention is not limited to the RGB type including three LEDs 1 of red, green and blue light. For example, if a white (W) LED having higher efficiency than red (R), green (G), and blue (B) LEDs is combined with R, G, and B LEDs, white point by R, G, and B LEDs can be made changeable while suppressing power consumption. Moreover, the WGB or WRG type, which is formed by combining the aforementioned W LED with G and B LEDs (a R LED is deleted from R, G, and B LEDs) or R and G LEDs (a B LED is deleted from R, G, and B LEDs), may be used. Since these two three-color combinations (i.e., WGB and WRG) are less than the four-color combination of W, R, G, and B by one color, the scale of LED output control when white point is changeable can be suppressed and the necessary number of LEDs can be reduced. This contributes to fabrication cost down of display devices.

In these combinations described here, the arrangement of the LEDs 1 in the LED cluster 1A is determined in such a way that chromaticity is optically balanced. For example, the LED arrangement may have a square, triangular, or rhombic pattern.

The purpose or use described in the ninth embodiment is an example. The present invention is not limited only to the combination of the LEDs 1 in the cluster 1A. Although not shown diagrammatically, a LED unit or device having multicolored LEDs (LED chips) 1 in its package may be used for the present invention.

With the direct type LED backlight device according to the ninth embodiment also, the same advantage as that of the aforementioned first embodiment is obtained. Moreover, in addition to this advantage, there is another advantage that an optimum characteristic can be provided in accordance with the purpose or use of a display device.

Tenth Embodiment

Figure 14:
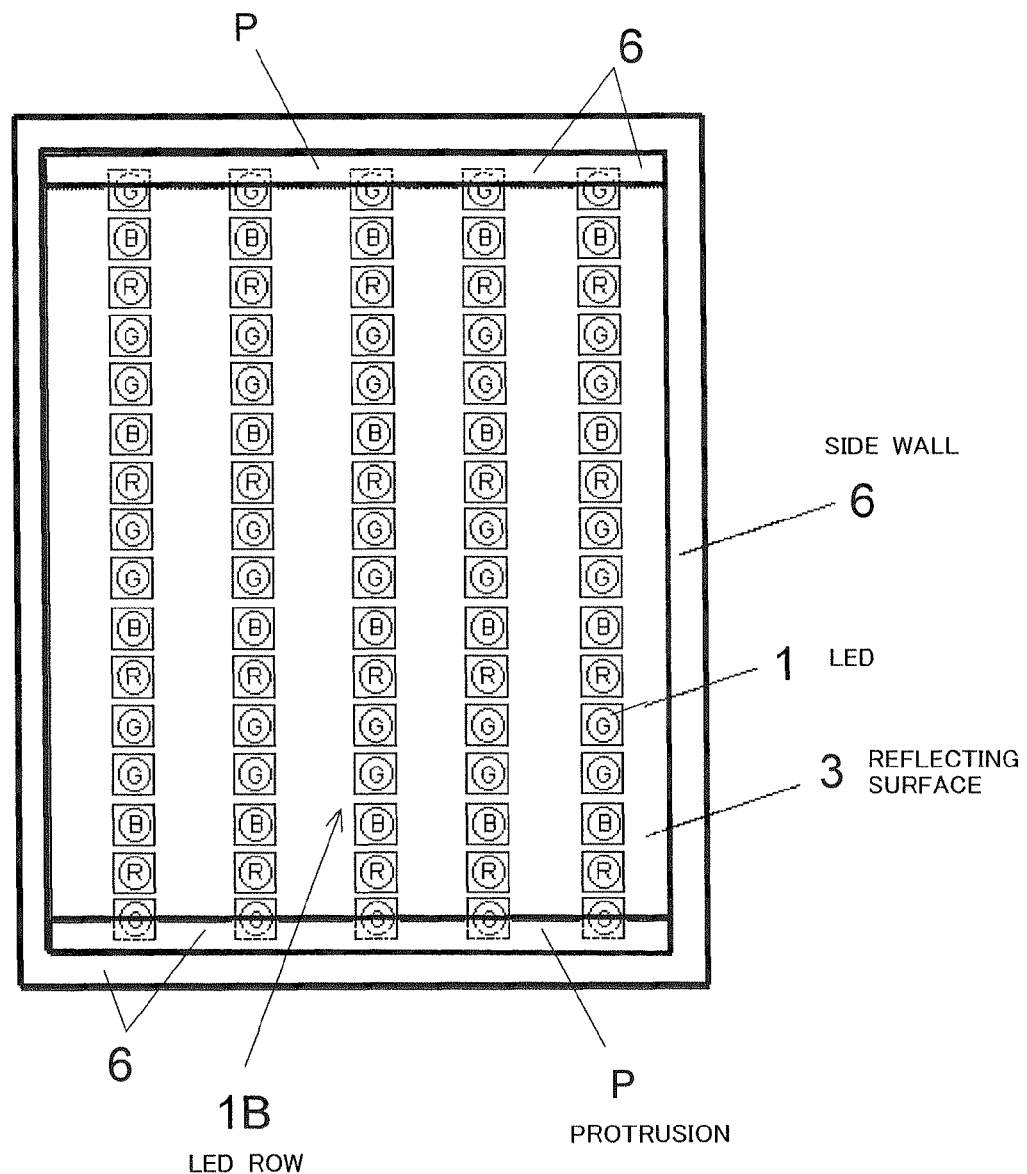
FIG. 14 is a plan view of the LED array used in a direct type LED backlight device according to a tenth embodiment of the present invention, where the LED array is seen from the display surface side (optical sheet side).

FIG. 14 is a plan view of the LED array used in a direct type LED backlight device according to a tenth embodiment of the present invention, where the LED array is seen from the emission side.

As shown in FIG. 14, the tenth embodiment is different from the aforementioned first embodiment in that the LEDs 1 are not combined to form the LED cluster 1A but R, G, and B LEDs 1 for three color light are arranged linearly in a predetermined sequence along one direction, forming a bar-shaped LED row or set 1B. The other structure of the tenth embodiment is the same as the first embodiment.

In each of the LED rows or sets 1B, red, green, and blue LEDs 1 are aligned in a predetermined order at constant pitches along one direction (i.e., the vertical direction in FIG. 14), forming a bar-shaped configuration. This arrangement pattern is the same as that for bar-shaped fluorescent lamps. A plurality of LED rows 1B (in other words, bar-shaped LED sets) are arranged on the reflecting surface 3 at constant pitches along a direction (i.e., the lateral direction in FIG. 14) perpendicular to the extension direction of the LED rows 1B, resulting in the LED array.

In this embodiment, since the LED array is formed by the combination of the bar-shaped LED sets or rows 1B, it is sufficient that the protrusion P of the side wall 6 is provided only at two opposite locations (on the inner surface 6f) where both ends of each LED row 1B are respectively positioned. This means that the structure of the side wall 6 is simplified. For this reason, color unevenness can be improved by providing the protrusion P on the inner surface 6a of the side wall 6 in such a way as to be placed in the locations where the outermost LEDs 1 in each LED row 1B are placed. For example, in FIG. 14, the outermost LEDs 1 in each LED row 1B are located at the upper and lower end positions.

Furthermore, if the bar-shaped LED rows 1B are arranged at sufficiently narrow pitches with respect to the cavity thickness of the backlight device and at the same time, the LED rows 1B are located sufficiently close to the parts (i.e., the left and right ends of the side wall 6 in FIG. 14) of the sidewall 6 which are parallel to the arrangement direction of the LED rows 1B (i.e., the lateral direction in FIG. 14), the protrusion P may be formed at these locations (i.e., the left and right ends of the side wall 6 in FIG. 14) also. In this case, there is another advantage that brightness unevenness occurring at the parts of the side wall 6 which are parallel to the arrangement direction of the LED rows 1B (i.e., the left and right ends of the side wall 6 in FIG. 14) can be suppressed.

Eleventh Embodiment

FIG. 15 is a plan view of the LED array used in a direct type LED backlight device according to an eleventh embodiment of the present invention, where the LED array is seen from the emission side.

As shown in FIG. 15, only white LEDs 1 are used as the light source in the eleventh embodiment. Moreover, similar to the above-described tenth embodiment, the white LEDs 1 are arranged at sufficient narrow pitches with respect to the cavity thickness of the backlight device and at the same time, the outermost LEDs 1 in the LED array are arranged close to the side wall 6. The protrusion P of the side wall 6 is formed to partially cover the emission surfaces of the outermost LEDs 1 like the above-described first embodiment.

In this embodiment, since the distances between the adjoining white LEDs 1 are constant within the LED array, brightness unevenness of white light from the LEDs 1 can be suppressed in the entire backlight device.

Variations

The above-described first to eleventh embodiments of are embodied examples of the present invention. Therefore, it is needless to say that the present invention is not limited to these embodiments and any other modification is applicable to these embodiments without departing the spirit of the present invention.

For example, the structure of the protrusion P formed on the inner surface 6f of the side wall 6 is not limited to ones explained in the aforementioned embodiments but is changeable voluntarily. Moreover, the layout of the LEDs 1 also is not limited to ones explained in the aforementioned embodiments but is changeable voluntarily.

The present invention is applicable to direct type LED backlight devices using LEDs as its light source, and LCD devices using the backlight devices.

What is claimed is:

1. A direct type LED backlight device comprising:
   a bottom wall;
   a set of optical members including at least a diffusion sheet and a prism sheet, arranged opposite to an inner surface of the bottom wall at a predetermined distance;
   a side wall holding the bottom wall and the set of optical members at the predetermined distance; and
   LEDs as a light source, fixed to the inner surface of the bottom wall;
   wherein the side wall comprises a protrusion protruding toward a central portion of an optical mixing space for optically mixing light emitted from the LEDs, the space being formed by the bottom wall, the side wall, and the set of optical members;
   wherein the protrusion extends over first ones of the LEDs that are directly adjacent to the side wall and does not extend over the LEDs farther from the side wall than the first ones of the LEDs, and
   wherein the protrusion overlaps a part, but not an entirety of the first ones of the LEDs so as to block light emitted from overlapped portions of the first ones of the LEDs in a direction perpendicular to the set of optical members.

2. A direct type LED backlight device according to claim 1, wherein a top end of the protrusion is located at a position shifted outward along the bottom wall with respect to centers of the light emitting surfaces of the first ones of the LEDs.

3. A direct type LED backlight device according to claim 1, wherein the side wall comprises a supporting surface for supporting the set of optical members, and an intersection formed by intersecting the supporting surface with an inner surface of the side wall is located at a position shifted outward along the bottom wall with respect to the top end of the protrusion.

4. A direct type LED backlight device according to claim 3, wherein positions of the top end of the protrusion and the intersection are determined in such a way that an outermost end of a display region of a liquid crystal panel to be combined with the backlight device is located between the top end of the protrusion and the intersection.

5. A direct type LED backlight device according to claim 1, wherein the light source has a cluster structure formed by combination of the LEDs emitting different color light.

6. A direct type LED backlight device according to claim 1, wherein the light source is formed by the LEDs emitting white light only.

7. A direct type LED backlight device according to claim 1, wherein the LEDs are arranged on the inner surface of the bottom wall at constant pitches to form a square arrangement or staggered arrangement.

8. A direct type LED backlight device according to claim 1, wherein a region of the side wall that is closer to the bottom wall than the protrusion has an optically absorbing surface.

9. A direct type LED backlight device according to claim 1, wherein a region of the side wall that is closer to the bottom wall than the protrusion has a diffuse reflection surface or a specular reflection surface.

10. A direct type LED backlight device according to claim 1, wherein a region of the side wall that is closer to the bottom wall than the protrusion has an optically absorbing surface and one of a diffuse reflection surface and a specular reflection surface.

11. A direct type LED backlight device according to claim 1, wherein a cross section of the protrusion is approximately triangular or rectangular, and the inner surface of the side wall is a flat surface.

12. A direct type LED backlight device according to claim 1, wherein a cross section of the protrusion is approximately triangular or rectangular, and the inner surface of the side wall is a depressed curved surface.

13. A direct type LED backlight device according to claim 1, wherein the light source comprises bar-shaped LED sets each of which is formed by aligning the LEDs emitting different color light along a first direction, and the bar-shaped LED sets are arranged at constant pitches along a second direction perpendicular to the first direction;
   wherein the protrusion is provided only at two opposite portions of the side wall, the two opposite portions being adjacent to each end of the bar-shaped LED sets and extending along the second direction.

14. A liquid crystal display device comprising:
   a liquid crystal panel; and
   the direct type LED backlight device according to claim 1.

15. A direct type LED backlight device comprising:
   a bottom wall;
   a set of optical members including at least a diffusion sheet and a prism sheet, arranged opposite to an inner surface of the bottom wall at a predetermined distance;
   a side wall holding the bottom wall and the set of optical members at the predetermined distance; and
   LEDs fixed to the inner surface of the bottom wall, first ones of the LEDS being adjacent to the side wall,
   wherein the side wall comprises a protrusion protruding toward a central portion of an optical mixing space for optically mixing light emitted from the LEDs, the space being formed by the bottom wall, the side wall, and the set of optical members,
   wherein the protrusion extends over first ones of the LEDs that are directly adjacent to the side wall and does not extend over the LEDs farther from the side wall than the first ones of the LEDs, and
   wherein the protrusion overlaps a part, but not an entirety of light emitting surfaces of the first ones of the LEDs that face the set of optical members.

* * * * *